(12) United States Patent
Kimura et al.

(10) Patent No.: US 10,583,982 B2
(45) Date of Patent: Mar. 10, 2020

(54) SHELF TRANSPORT SYSTEM, SHELF TRANSPORT VEHICLE, AND SHELF TRANSPORT METHOD

(71) Applicant: Hitachi, Ltd., Tokyo (JP)

(72) Inventors: Nobutaka Kimura, Tokyo (JP); Fumiko Beniyama, Tokyo (JP); Keisuke Fujimoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 122 days.

(21) Appl. No.: 15/747,559

(22) PCT Filed: Aug. 3, 2015

(86) PCT No.: PCT/JP2015/071933
§ 371 (c)(1),
(2) Date: Jan. 25, 2018

(87) PCT Pub. No.: WO2017/022048
PCT Pub. Date: Feb. 9, 2017

(65) Prior Publication Data
US 2018/0215539 A1    Aug. 2, 2018

(51) Int. Cl.
*B65G 1/02* (2006.01)
*G05D 1/02* (2006.01)
(Continued)

(52) U.S. Cl.
CPC ........... *B65G 1/026* (2013.01); *B65G 1/0492* (2013.01); *G05D 1/0227* (2013.01);
(Continued)

(58) Field of Classification Search
CPC ........ B65G 1/026; B65G 1/0492; B65G 1/10; B65G 1/1378; G05D 1/0238;
(Continued)

(56) References Cited

U.S. PATENT DOCUMENTS 9,549,489 B2 *  1/2017  Bousseton .......... H05K 7/20745
9,826,656 B2 * 11/2017  Connor ................ H05K 7/1489
(Continued)

FOREIGN PATENT DOCUMENTS

JP   2002-182744 A    6/2002
JP   2009-539727 A   11/2009
(Continued)

OTHER PUBLICATIONS

International Search Report of PCT/JP2015/071933 dated Oct. 27, 2015.

*Primary Examiner* — Frederick M Brushaber
(74) *Attorney, Agent, or Firm* — Mattingly & Malur, PC

(57) ABSTRACT

A shelf transport system comprising a shelf transport vehicle transporting a shelf having shelf legs, the shelf transport vehicle comprising: a distance sensor measuring a distance to an obstacle; a shelf leg candidate detection module detecting shelf leg candidates, which are candidates for the shelf legs; a shelf arrangement candidate calculation module calculating shelf arrangement candidates, in each of which the shelf is virtually arranged on the shelf leg candidates; an excess/deficiency calculation module calculating, for each of the shelf arrangement candidates, the excessive and the deficient number of shelf leg candidates; a shelf arrangement determination module determining a shelf arrangement from among the shelf arrangement candidates based on the excessive and the deficient number of shelf leg candidates; and a movement destination determination module determining a shelf to which the shelf transport vehicle is to be moved based on the shelf arrangement.

9 Claims, 14 Drawing Sheets

(51) Int. Cl.
*B65G 1/137* (2006.01)
*B65G 1/10* (2006.01)
*B65G 1/04* (2006.01)

(52) U.S. Cl.
CPC ......... *G05D 1/0236* (2013.01); *G05D 1/0238* (2013.01); *G05D 1/0274* (2013.01); *B65G 1/10* (2013.01); *B65G 1/1378* (2013.01); *G05B 2219/40298* (2013.01); *G05D 2201/0216* (2013.01)

(58) Field of Classification Search
CPC .. G05D 1/0227; G05D 1/0236; G05D 1/0274; G05D 2201/0216; G05B 2219/40298
See application file for complete search history.

(56) References Cited

U.S. PATENT DOCUMENTS

| | | | |
|---|---|---|---|
| 2007/0288123 | A1 | 12/2007 | D'Andrea et al. |
| 2012/0119632 | A1* | 5/2012 | Bousseton ......... H05K 7/20745 312/236 |
| 2016/0026186 | A1* | 1/2016 | Kazama ............... G05D 1/0274 701/24 |

FOREIGN PATENT DOCUMENTS

| | | |
|---|---|---|
| JP | 2011-150443 A | 8/2011 |
| JP | 2014-089740 A | 5/2014 |
| WO | 2007/145749 A2 | 12/2007 |

\* cited by examiner

SHELF MODEL DATA

| SHELF TYPE ID | SHELF LEG DISTANCE | SHELF LEG MODEL |
|---|---|---|
| A | P1, P2 | L0, δ |
| B | P1, P1 | |
| ... | ... | ... |

PROCESSING OF EXTRACTING CONTINUOUS PORTION

COMBINATION OF SHELF LEG CANDIDATES SERVING
AS SHELF SIDE HAVING SHELF LEG DISTANCE P1

COMBINATION OF SHELF LEG CANDIDATES SERVING
AS SHELF SIDE HAVING SHELF LEG DISTANCE P2

EXCESS: 8, DEFICIENCY: 2

EXCESS: 15, DEFICIENCY: 0

EXCESS: 10, DEFICIENCY: 1, INTERFERENCE: 2

EXCESS: 15, DEFICIENCY: 2, INTERFERENCE: 3

SHELF TRANSPORT SYSTEM, SHELF TRANSPORT VEHICLE, AND SHELF TRANSPORT METHOD

BACKGROUND

The present invention is related to a shelf convention system comprising a shelf transport vehicle configured to transport a shelf having a plurality of shelf legs.

In recent years, there have been a growing number of, for example, warehouses or factories handling a wide variety of products, such as a mail-order warehouse or a high-mix low-volume production factory, in order to flexibly satisfy increasingly diverse consumer needs, and there has been a demand for promotion of work efficiency and automation in, for example, warehouses or factories.

There is known a technology of a shelf transport vehicle transporting a shelf storing products in order to automate those tasks. In relation to this technology, JP 2009-539727 A, JP 2014-089740 A, and JP 2002-182744 A are known.

In JP 2009-539727 A, there is a description "A system for transporting inventory items includes an inventory holder capable of storing inventory items and a mobile drive unit. The mobile drive unit is capable of moving to a first point with the inventory holder at least one of coupled to and supported by the mobile drive unit. The mobile drive unit is additionally capable of determining a location of the inventory holder and calculating a difference between the location of the inventory holder and the first point. The mobile drive unit is then capable of determining whether the difference is greater than a predetermined tolerance. In response to determining that the difference is greater than the predetermined tolerance, the mobile drive unit is also capable of moving to a second point based on the location of the inventory holder, docking with the inventory holder, and moving the mobile drive unit and the inventory holder to the first point." (refer to Abstract).

In JP 2014-089740 A, there is a description "A plurality of pairs of shape information on a predetermined area on a preset environmental map and properties of the predetermined area on the environmental map are stored, the predetermined area stored in a storage part is compared with the environmental map, and properties corresponding to the predetermined area are read out so as to update the environmental map according to properties of a measurement place." (refer to Abstract).

In JP 2002-182744 A, there is a description "The unmanned carrier is provided with a function which approaches the leg parts of the pallet having leg parts while lowering a load carrying platform, raises the load carrying platform and carries and transports the pallet. At the time of invasion to the pallet, an approach sensor scanning laser beams and detecting a distance and an angle detects a distance to both leg parts of the pallet, operates an inclination with respect to the center line of the pallet and a distance to the center line and guides the carrier so that the center line of the unmanned carrier is matched with the center line of the pallet. A side sensor detecting an interval to the leg parts of the pallet arranged on the side of a car body guides the carrier after approaching the pallet." (refer to Abstract).

Further, JP 2011-150443 A is known as a technology of an unmanned rack conveyance vehicle recognizing, for example, the position of another unmanned rack conveyance vehicle. In JP 2011-150443 A, there is a description "A first robot includes: a measurement part measuring the reflection light intensity of an object; an arithmetic part analyzing a measurement result obtained by the measurement part; and a drive part moving the first robot. A second robot includes a plurality of markers each having a retroreflection property. The arithmetic part of the first robot calculates positions of the plurality of markers of the second robot based on a measurement result of the measurement part, recognizes a position and an attitude of the second robot based on a result of the calculation, and calculates a parameter for moving the first robot based on a result of the recognition of the position and the attitude of the second robot. The drive part of the first robot moves the first robot based on the parameter." (refer to Abstract).

At the time of introduction of the system including an unmanned shelf transport vehicle, shelves storing products are required to be aligned at a predetermined location. In the system of JP 2009-539727 A, the position of a shelf is required to be grasped in order for the unmanned shelf transport vehicle to transport the shelf. However, shelves before being aligned are arranged dispersedly, and workers are required to align those shelves by themselves because the unmanned shelf transport vehicle cannot grasp the positions.

Meanwhile, the unmanned shelf transport vehicle has a function of recognizing its own position, and moves along a path set by an unmanned shelf transport vehicle management apparatus for managing the unmanned shelf transport vehicle based on its own recognized position. In JP 2009-539727 A, the unmanned shelf transport vehicle reads a marker on the floor to recognize its own position, and in JP 2014-089740 A, the unmanned shelf transport vehicle compares an environmental map with a measurement result of a distance sensor to recognize its own position. However, with any of those methods, the unmanned shelf transport vehicle may fail to recognize and track its own position. For example, with the method of JP 2009-539727 A, when the unmanned shelf transport vehicle has moved out of the path due to, for example, slip of a tire, the unmanned shelf transport vehicle cannot read the marker and fails to track its own position. Further, with the method of JP 2014-089740 A, when the unmanned shelf transport vehicle is surrounded by other unmanned shelf transport vehicles, the measurement result of the distance sensor is not matched with the environmental map, and the unmanned shelf transport vehicle fails to track its own position. In this manner, when the unmanned shelf transport vehicle has failed to track its own position, the unmanned shelf transport vehicle cannot recognize its own position again unless workers return the unmanned shelf transport vehicle to a predetermined position.

Even when the absolute positions of shelves before being aligned at the time of introduction of the system cannot be grasped, the unmanned shelf transport vehicle can get under a shelf to transport the shelf by recognizing its own position and attitude relative to the shelf. Further, when the unmanned shelf transport vehicle has failed to track its own position, the unmanned shelf transport vehicle recognizes its own position and attitude relative to a shelf to get under the shelf. In this case, when the unmanned shelf transport vehicle gets under the shelf, the unmanned shelf transport vehicle can read identification information (e.g., a barcode) attached to the bottom of the shelf) on the shelf. The unmanned shelf transport vehicle transmits the read identification information on the shelf to the unmanned shelf transport vehicle management apparatus, which grasps the position of the shelf, and the unmanned shelf transport vehicle management apparatus notifies the unmanned shelf transport vehicle of the position of the shelf, to thereby enable the unmanned shelf transport vehicle to recognize its own position. In this manner, it is important for the unmanned shelf transport vehicle to recognize its own position and attitude relative to the shelf.

In JP 2002-182744 A, there is disclosed an unmanned carrier configured to detect a center line of a pallet based on the measurement result of the distance sensor and get under the pallet on the detected center line. However, this disclosure is based on the assumption that there is only one pallet within the measurement range of the distance sensor, and the unmanned carrier falsely recognizes a pallet when there are a plurality of pallets within the measurement range of the distance sensor.

Further, in JP 2011-150443 A, it is assumed that an object has a continuous surface. When the unmanned shelf transport vehicle can get under a shelf, the distance sensor of the unmanned shelf transport vehicle can measure only the legs of the shelf, and thus the method disclosed in JP 2011-150443 A cannot be applied to the shelf.

SUMMARY OF THE INVENTION

This invention has a purpose to provide an unmanned shelf transport vehicle capable of recognizing positions and attitudes of a plurality of shelves even when there are a plurality of shelves within a measurement range of a distance sensor.

In order to solve the above problem, a shelf transport system comprises a shelf transport vehicle configured to transport a shelf, the shelf comprising a plurality of shelf legs, the shelf transport vehicle comprising: a distance sensor configured to measure a distance to an obstacle; a shelf leg candidate detection module configured to detect shelf leg candidates, which are candidates for the plurality of shelf legs, based on a measurement result of the distance sensor; a shelf arrangement candidate calculation module configured to calculate a plurality of shelf arrangement candidates, in each of which the shelf is virtually arranged on the shelf leg candidates detected by the shelf leg candidate detection module; an excess/deficiency calculation module configured to calculate, for each of the plurality of shelf arrangement candidates calculated by the shelf arrangement candidate calculation module, an excessive number of shelf leg candidates, which indicates a number of shelf leg candidates other than shelf legs of the arranged shelf, and a deficient number of shelf leg candidates, which indicates a number of positions at which shelf leg candidates corresponding to shelf legs of the arranged shelf fail to be detected; a shelf arrangement determination module configured to determine a shelf arrangement from among the plurality of shelf arrangement candidates based on the excessive number of shelf leg candidates and the deficient number of shelf leg candidates, which are calculated by the excess/deficiency calculation module; and a movement destination determination module configured to determine a shelf to which the shelf transport vehicle is to be moved based on the shelf arrangement determined by the shelf arrangement determination module.

According to the present invention it is possible to provide an unmanned shelf transport vehicle capable of recognizing positions and attitudes of a plurality of shelves even when there are a plurality of shelves within a measurement range of a distance sensor.

Problems, structures, and effects except for those described above become apparent by the descriptions of embodiment below. Further, excessive and deficient numbers of shelf leg candidates are collectively hereinafter referred to as "excessive/deficient number of shelf leg candidates".

BRIEF DESCRIPTION OF THE DRAWINGS

The present invention can be appreciated by the description which follows in conjunction with the following figures, wherein.

DETAILED DESCRIPTION OF EMBODIMENTS

Figure 1:
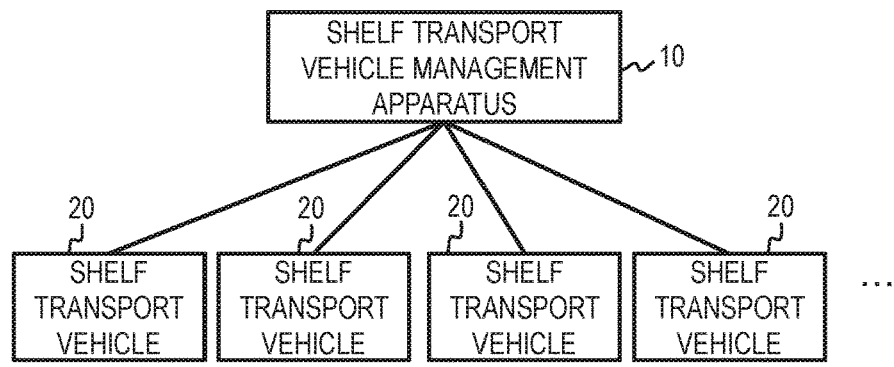
FIG. 1 is a configuration diagram for illustrating a shelf transport system according to an embodiment.

FIG. 1 is a configuration diagram of a shelf transport system according to an embodiment of this invention.

The shelf transport system includes a shelf transport vehicle management apparatus 10 and at least one shelf transport vehicle 20. The shelf transport vehicle management apparatus 10 and the shelf transport vehicle 20 are coupled to each other in a wireless manner. The shelf transport vehicle management apparatus 10 determines a shelf 30 to be transported by the shelf transport vehicle 20, calculates a path from a current position of the shelf transport vehicle 20 to the shelf 30 and a path from the shelf 30 to a transport destination, and transmits a transport plan containing those paths to the shelf transport vehicle 20. The shelf transport vehicle 20 moves and transports the shelf 30 to the transport destination based on the received transport plan.

Figure 3:
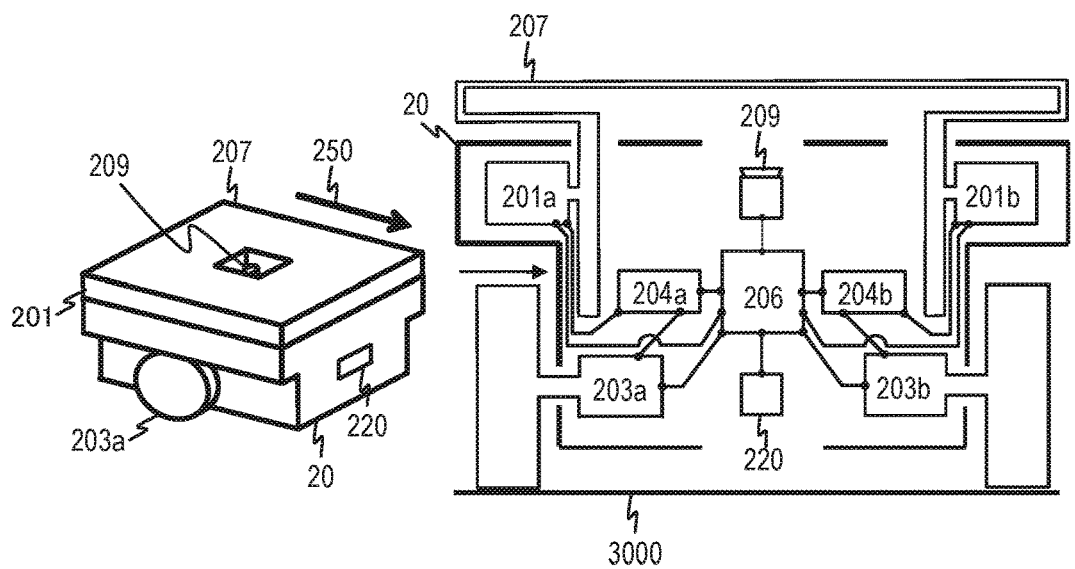
FIG. 3 is a configuration diagram for illustrating a shelf transport vehicle according to this embodiment.

The shelf transport vehicle 20 uses a measurement result of a distance sensor 220, which is illustrated in FIG. 3, to determine the shelf 30 to get under and gets under the determined shelf 30, for example, before the shelves 30 are aligned or when the shelf transport vehicle 20 fails to track its own position. The shelf transport vehicle management apparatus 10 does not grasp positions of the shelves 30 before those shelves 30 are aligned, but the shelf transport vehicle 20 can determine the shelf 30 to get under and transport the determined shelf 30 to a predetermined position. Further, when the shelf transport vehicle 20 fails to track its own position, a barcode or the like containing printed identification information on the shelf 30 is attached to a surface of a leg of the shelf 30, and thus the shelf transport vehicle 20 gets under the shelf 30, reads identification information on the shelf 30, and transmits the read identification information on the shelf 30 to the shelf transport vehicle management apparatus. The shelf transport vehicle management apparatus 10 grasps the position of the shelf 30, and thus transmits position information corresponding to the received identification information on the shelf 30 to the shelf transport vehicle 20. As a result, the shelf transport vehicle 20 can recognize its own position by getting under the shelf 30.

Figure 2:
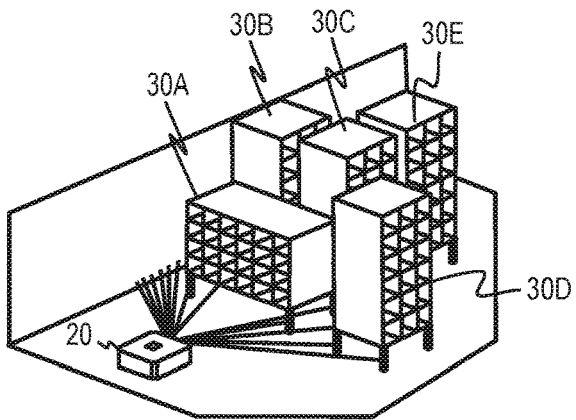
FIG. 2 is an explanatory diagram for illustrating a warehouse to which the shelf transport system according to this embodiment is applied.

FIG. 2 is an explanatory diagram for illustrating a warehouse to which the shelf transport system according to this embodiment is applied.

FIG. 2 is an illustration of a state before alignment of a plurality of shelf 30A to shelf 30E (hereinafter sometime collectively referred to as "shelf 30"), and the plurality of shelves 30 are arranged dispersedly in one location. Four shelf legs are provided on the bottom surface of the shelf 30. The shelf transport vehicle 20 determines the shelf 30 to get under based on the measurement result of the distance sensor 220, gets under the shelf 30 by passing through between shelf legs of the shelf 30, lifts and moves the shelf 30, to thereby transport the shelf 30. With this, it is possible to align the shelves 30 arranged dispersedly in one location.

FIG. 3 is a configuration diagram of the shelf transport vehicle 20 according to this embodiment. The left part of FIG. 3 is an external view of the shelf transport vehicle 20, and the right part of FIG. 3 is an explanatory diagram for illustrating the internal structure of the shelf transport vehicle 20. The right part of FIG. 3 is a diagram for illustrating the inside of the shelf transport vehicle 20 as viewed from a direction opposite to a traveling direction of the shelf transport vehicle 20.

The shelf transport vehicle 20 gets under the shelf 30 and operates a loading/unloading unit 201 to lift the shelf 30. The loading/unloading unit 201 is a mechanism that is positioned in an upper part of the shelf transport vehicle 20 and operates to lift the shelf 30, and includes a motor, a motor controller, a gear and shaft configured to convert rotational movement into vertical movement, a controller configured to control the motor, and an upper plate.

The loading/unloading unit 201 is coupled to a power supply 204 and a controller 206, and moves the upper plate up or down by controlling its own motor based on an instruction from the controller 206. There may be a plurality of components other than the upper plate, but it is preferred that the plurality of motors be synchronized for the same movement in order to keep the upper plate horizontal.

When the shelf transport vehicle 20 lifts the shelf 30, first, the controller 206 controls a drive unit 203 so that the shelf transport vehicle 20 gets under the shelf 30. Under this state, the controller 206 instructs the loading/unloading unit 201 to control the motor and move up the upper plate. The loading/ unloading unit 201 gradually moves up the upper plate as instructed by the controller 206. Then, the surface of the upper plate of the loading/unloading unit 201 reaches a height of a surface to be contacted that is the bottom of the shelf 30, and touches the surface to be contacted. The surface of the upper plate of the loading/unloading unit 201 touches the surface to be contacted of the shelf 30, and thus is hereinafter referred to as "contacting surface 207". Further, as the upper plate of the loading/unloading unit 201 is moved up, legs of the shelf 30 move further away from the ground, with the result that the shelf 30 is lifted. In other words, the shelf transport vehicle 20 carries the shelf 30 using the loading/unloading unit 201.

When the shelf transport vehicle 20 carrying the shelf 30 tries to arrange the shelf 30, first, the controller 206 controls the drive unit 203 and moves the shelf transport vehicle 20 to a position at which the shelf 30 is to be arranged. After the shelf transport vehicle 20 has reached the position, the controller 206 instructs the loading/unloading unit 201 to control the motor and move down the upper plate. As the loading/unloading unit 201 gradually moves down the upper plate as instructed by the controller 206, the shelf 30 moves down at the same time. In the end, the legs of the shelf 30 reach and touch the ground. Further, as the upper plate of the loading/unloading unit 201 is moved down, the contacting surface 207 of the shelf transport vehicle 20 and a surface 103 to be contacted of the shelf 30 become more separated from each other, and arrangement of the shelf 30 is complete.

The shelf transport vehicle 20 according to this embodiment operates the drive unit 203 to move itself. The drive unit 203 includes, for example, a motor, a motor controller, and a wheel. Further, the drive unit 203 may include a rotary encoder configured to measure rotation of the wheel.

At least two independently operating motors and three wheels are required to implement two-dimensional movement of the shelf transport vehicle 20. For example, it is conceivable that one wheel is mounted to each of the left side and right side of the shelf transport vehicle 20, the shelf transport vehicle 20 includes a motor and a motor controller for independently controlling each wheel, and one caster is mounted to the shelf transport vehicle 20. Then, the shelf transport vehicle 20 moves straight ahead with the same rotation speed of the left and right wheels, and turns at the same place when rotation directions of the left and right wheels are reverse. The drive unit 203 is coupled to the power supply 204 and the controller 206, and controls its own motor to move the shelf transport vehicle 20 based on an instruction from the controller 206.

The power supply 204 is implemented as a battery. The power supply 204 supplies power to the loading/unloading unit 201, the drive unit 203, the controller 206, a shelf recognition sensor 209, and the distance sensor 220 of the shelf transport vehicle 20. In this embodiment, power is supplied to the shelf recognition sensor 209 and the distance sensor 220 indirectly via the controller 206, but whether to supply power to each component directly or indirectly may be determined based on implementation of each component.

The controller 206 is implemented as a combination of a processor 420, a memory 430, a secondary storage device 440, an external interface (IF) 450, and a wireless interface (IF) 460. The secondary storage device 440 is, for example, a hard disk drive (HDD) or a flash memory. The wireless communication function of the wireless IF 460 is implemented as, for example, a wireless LAN. The controller 206 is supplied with power from the power supply 204, and controls other components inside the shelf transport vehicle 20, namely, the loading/unloading unit 201, the drive unit 203, the shelf recognition sensor 209, and the distance sensor 220. Further, the controller 206 communicates to/from the shelf transport vehicle management apparatus 10 via the wireless communication function for reception of an operation instruction and reporting of an operation status.

Except for the case of failing to track its own position, in order to move along a movement path received from the shelf transport vehicle management apparatus 10, the controller 206 may calculate its own position and attitude, calculate a difference between the attitude of the shelf transport vehicle 20 and a target movement direction based on the result of calculating its own position and attitude and the movement path, and determine the latest operation parameter of the drive unit 203 based on the result of calculating the difference. For example, a method of comparing the measurement result acquired by the distance sensor 220 with a map stored in the controller 206 in advance is conceivable as the method of calculating its own position and attitude.

In this case, a measurement result of the rotary encoder, which is a component of the drive unit 203, may be acquired and used to recognize its own position or determine the operation parameter. Further, in order to check identification information on the shelf 30 and deviation of a relative positional attitude with respect to the shelf 30, the shelf identification information on the shelf 30 is recognized and deviation of the relative positional attitude between the shelf transport vehicle 20 and the shelf 30 is calculated based on a measurement result acquired by the shelf recognition sensor 209.

The shelf recognition sensor 209 is mounted so as to be capable of performing measurement in a vertically upward direction to measure a shelf bottom marker on the bottom surface of the shelf 30, which is a shelf identification information provision unit configured to indicate the identification information on the shelf 30, when the shelf transport vehicle 20 gets under the shelf 30. The shelf recognition sensor 209 is selected depending on characteristics of the shelf bottom marker. For example, when the shelf bottom marker is a two-dimensional barcode, the shelf recognition sensor 209 is implemented as, for example, a monochrome camera or a color camera, and a front direction of the shelf 30 can be grasped. The shelf recognition sensor 209 is coupled to the controller 206, and performs measurement based on an instruction from the controller 206, and transmits the measurement result to the controller 206. Further, when the shelf identification information provision unit of the shelf 30 is, for example, an IC card, the shelf recognition sensor 209 is a device for reading the IC card.

This embodiment instructs, for example, a shape map of the entire space, and adopts a method of calculating a correspondence between a partial shape in the space measured by the shelf transport vehicle 20 and a part of the shape map to recognize its own position and attitude, and thus the distance sensor 220 is implemented as, for example, a laser distance sensor or a sonar mounted so as to measure an obstacle on a horizontal plane. In FIG. 3, the distance sensor 220 is mounted near the center of the shelf transport vehicle 20 in the front direction, but for example, the distance sensor 220 may be mounted on a right end or left end of the shelf transport vehicle 20 in the front direction. When the measurement range of the distance sensor 220 covers 270 degrees or more, and the distance sensor 220 gets under the shelf 30, the distance sensor 220 can detect three shelf legs of the shelf 30. Therefore, it is possible to cause the shelf transport vehicle 20 to get under the shelf 30 near the center of the bottom surface of the shelf 30 with accuracy.

The distance sensor 220 is coupled to the controller 206, performs measurement based on an instruction from the controller 206, and transmits the measurement result to the controller 206.

Figures 4, 5:
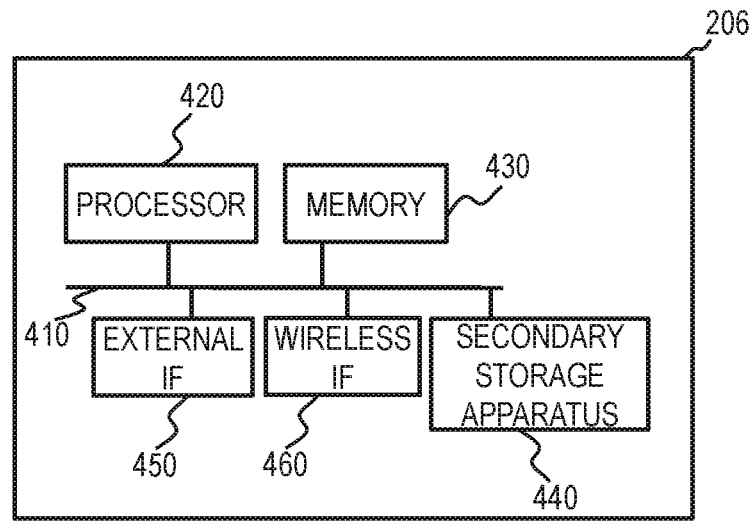
FIG. 4 is a hardware configuration diagram for illustrating a controller in this embodiment.
FIG. 5 is an explanatory diagram for illustrating shelf model data in this embodiment.

FIG. 4 is a hardware configuration diagram of the controller 206 in this embodiment.

The controller 206 includes the processor 420, the memory 430, the secondary storage device 440, the external interface (IF) 450, and the wireless interface (IF) 460. Those components are coupled to one another via a bus 410.

The processor 420 is configured to execute various kinds of arithmetic processing. The secondary storage device 440 is a non-volatile and non-transitory storage medium, and stores various programs and various kinds of data. The memory 430 is a volatile and transitory storage medium. Various programs and various kinds of data stored in the secondary storage device 440 are loaded into the memory 430, and the processor 420 executes various programs loaded into the memory 430 and reads or write various kinds of data loaded into the memory 430.

The external IF 450 is an interface coupled to the drive unit 203, the power supply 204, the shelf recognition sensor 209, and the distance sensor 220.

The wireless IF 460 is an interface for coupling to the shelf transport vehicle management apparatus 10 in a wireless manner.

The hardware configuration of the shelf transport vehicle management apparatus 10 is the same as that of FIG. 4 except for the fact that the external IF 450 is not included, and thus a description thereof is omitted.

FIG. 5 is table for showing shelf model data 500 in this embodiment.

The shelf model data 500 is stored in the memory 430 of the controller 206 of the shelf transport vehicle 20, and data on shelf legs for extracting shelf leg candidates from the measurement result of the distance sensor 220 and data on a distance between shelf legs for determining arrangement of the shelves 30 based on the extracted shelf leg candidates are registered in the shelf model data 500.

The shelf model data 500 includes a shelf type ID 501, a shelf leg distance 502, and a shelf leg model 503.

The shelf type ID 501 stores an identifier of the type of the shelf 30 existing in, for example, a warehouse. The shelves 30 having the same distance between shelf legs belong to the same type, and the shelves 30 having different distances between shelf legs belong to different types. For example, in FIG. 2, there are a type "A" of a shelf 30A having a rectangular bottom surface and a type "B" of shelves 30B to 30E having square bottom surfaces.

The shelf leg distance 502 stores a distance between shelf legs. As illustrated in FIG. 2, when shelf legs are installed at vertices of the bottom surface of the shelf 30, the distance between shelf legs indicates the length of a side of the shelf 30, and thus the length of a side of the shelf 30 may be registered in the shelf leg distance 502. P1 and P2 are registered in the shelf leg distance 502 of the type "A" having a rectangular bottom surface, and P1 and P1 are registered in the shelf leg distance 502 of the type "B" having a square bottom surface.

The shelf leg model 503 stores data enabling identification of the shape of a shelf leg, the longest distance (L0) between two end points of one shelf leg, and an offset (δ). The data enabling identification of the shape of a shelf leg stores information indicating the type (e.g., whether the shelf leg is a cylinder or a cuboid) of the shape of the shelf leg, and the radius of the cylinder when the shelf leg is a cylinder, or the lengths of short and long sides when the shelf leg is a cuboid. Further, when the shelf leg is a cylinder, the diameter of the cylinder is the longest distance (L0), whereas when the shelf leg is a cuboid, the length of the diagonal line is the longest distance (L0). Details of the offset (δ) are described with reference to FIG. 9A to FIG. 9C.

When the longest distance L0 of a shelf leg differs depending on the type of the shelf leg, the shelf leg model 503 may be registered for each type of the shelf leg.

Figure 6:
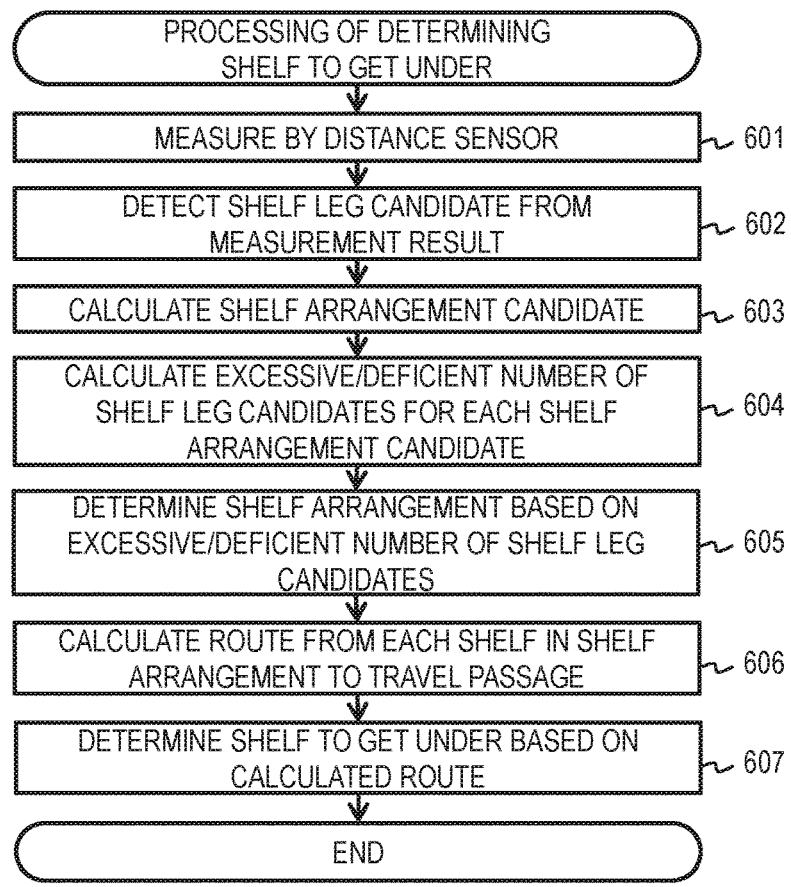
FIG. 6 is a flowchart for illustrating processing of determining a shelf to get under in this embodiment.

FIG. 6 is a flowchart for illustrating processing of determining a shelf to get under in this embodiment.

The processing of determining a shelf to get under is processing of determining the shelf 30 that the shelf transport vehicle 20 is to get under, and is executed, for example, when the shelves 30 before being aligned are to be aligned or when the shelf transport vehicle 20 has failed to track its own position. A program corresponding to the processing of determining a shelf to get under is stored in the memory 430 of the controller 206 of the shelf transport vehicle 20, and the processor 420 executes the program to execute the processing of determining a shelf to get under.

First, the controller 206 of the shelf transport vehicle 20 starts measurement by the distance sensor 220, and the processor 420 of the controller 206 acquires a measurement result from the distance sensor 220 (Step 601). Details of the measurement result of the distance sensor 220 are described with reference to FIG. 7.

Next, the processor 420 extracts a continuous portion from the measurement result acquired in the processing of Step 601, refers to the shelf leg model 503 contained in the shelf model data 500, and extracts a portion as a shelf leg candidate from the extracted continuous portion (Step 602). Details of the processing of extracting a continuous portion are described with reference to FIG. 8A and FIG. 8B. Further, details of the processing of extracting a shelf leg candidate are described with reference to FIG. 9A to FIG. 9C.

Next, the processor 420 refers to the shelf leg distance of the shelf model data 500, extracts combinations of shelf leg candidates satisfying the shelf leg distance from the shelf leg candidates extracted in the processing of Step 602, extracts a junction shelf leg candidate serving as a junction of extracted two combinations of shelf leg candidates, and calculates a shelf arrangement candidate in which the shelf 30 is virtually arranged on the extracted junction shelf leg candidate (Step 603). Details of the processing of calculating the shelf arrangement candidate are described with reference to FIG. 10A to FIG. 14C.

Next, the processor 420 calculates, for each shelf arrangement candidate calculated in the processing of Step 603, the excessive number of shelf leg candidates, which indicates the number of shelf leg candidates that are not shelf legs of the shelf 30 in the shelf arrangement candidate, and the deficient number of shelf leg candidates, which indicates the number of positions at which a shelf leg candidate corresponding to a shelf leg of the shelf 30 in the shelf arrangement candidate is not detected (Step 604). Details of the processing of calculating the excessive/deficient number of shelf leg candidates are described with reference to FIG. 15A to FIG. 17C.

Next, the processor 420 determines a shelf arrangement from the shelf arrangement candidates calculated in the processing of Step 603 based on the excessive/deficient number of shelf leg candidates calculated in the processing of Step 604 (Step 605).

Next, the processor 420 calculates a transport route from each shelf 30 in the shelf arrangement determined in the processing of Step 605 (Step 606). The transport route is, for example, the shortest route from each shelf 30 to a travel passage in which the shelf transport vehicle 20 travels in a warehouse or factory.

Next, the processor 420 excludes the shelves 30 that cannot be transported from candidates for the shelf 30 to get under based on the transport route calculated in the processing of Step 606 and arrangement positions of those shelves 30 in the shelf arrangement determined in Step 605, to thereby determine the shelf 30 to get under from the transportable shelves 30 (Step 607), and ends the processing of determining a shelf to get under. Specifically, the processor 420 identifies a shelf that has other shelves 30 on the transport route in the shelf arrangement as the shelf 30 that cannot be transported. With this, even before the shelves 30 are aligned, the shelf transport vehicle 20 can get under the shelf 30, which can be transported. Therefore, it is possible to efficiently align the shelves 30.

When the shelf 30 to get under is determined in the processing of determining a shelf to get under, which is executed when the shelf transport vehicle 20 has failed to track its own position, and the shelf transport vehicle 20 gets under the shelf 30, the shelf recognition sensor 209 acquires identification information on the shelf 30, and transmits the acquired identification information on the shelf 30 to the shelf transport vehicle management apparatus 10. The shelf transport vehicle management apparatus 10 manages the identification information on the shelf 30 and the position information on the shelf 30 in association with each other, and thus transmits position information corresponding to the received identification information on the shelf 30 to the shelf transport vehicle 20. The shelf transport vehicle 20 can recognize its own position by receiving the position information on the shelf 30. When the shelf transport vehicle 20 has failed to track its own position, the shelf transport vehicle 20 can identify its own position by executing the processing of determining a shelf to get under, and getting under any one of the shelves 30.

Further, the shelves 30 whose positions are not changed frequently through transport by the shelf transport vehicle 20, such as the shelves 30 that are transported less frequently than the other shelves 30 or the shelves 30 that are not transported, may be installed as landmark shelves, and the processor 420 may determine the landmark shelves as the shelf 30 to get under preferentially. The processor 420 can identify portions having a stronger reflection intensity than other portions as shelf legs of landmark shelves based on the measurement result of the distance sensor 220 by attaching retroreflective markers to the shelf legs of landmark shelves. Through management of accurate position information on landmark shelves by the shelf transport vehicle management apparatus 10, even when the shelf transport vehicle 20 has failed to track its own position, the shelf transport vehicle 20 can recognize its own position information more accurately by getting under a landmark shelf and transmitting identification information on the landmark shelf to the shelf transport vehicle management apparatus 10 than by getting under the shelf 30 that is transported less frequently. The accurate position information on landmark shelves may be stored in the shelf transport vehicle 20 in advance, and communication between the shelf transport vehicle 20 and the shelf transport vehicle management apparatus 10 may be omitted.

Further, the shelf transport vehicle 20 transmits the shelf arrangement determined in the processing of Step 605 and information on the shelf 30 to get under determined in the processing of Step 607 to the shelf transport vehicle management apparatus 10. The shelf transport vehicle management apparatus 10 determines a transport destination of the shelf 30 for the shelf transport vehicle 20 to get under as a position existing in a predetermined range from the shelf in the received shelf arrangement. Then, the shelf transport vehicle management apparatus 10 transmits the position of the transport destination to the shelf transport vehicle 20. The shelf transport vehicle 20 transports the shelf 30 to the position of the received transport destination. For example, the predetermined range is desired to be set to a range in which the distance sensor 220 can measure a distance. With this, even when the shelf transport vehicle 20 has failed to track its own position during transport of the shelf 30 that the shelf transport vehicle 20 has got under, the shelf 30 exists within a range in which the distance sensor 220 can measure a distance, which enables detection of the shelf and recognition of its own position again.

Figure 7:
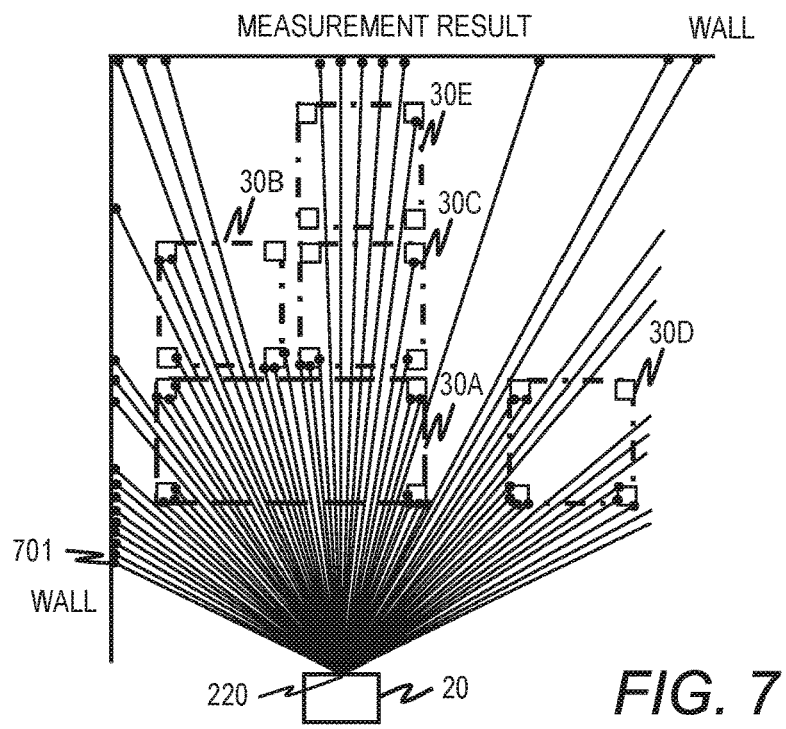
FIG. 7 is an explanatory diagram for illustrating a measurement result of a distance sensor in this embodiment.

FIG. 7 is an explanatory diagram for illustrating the measurement result of the distance sensor 220 in this embodiment.

The distance sensor 220 radiates light, for example, infrared light, and receives light reflected by an obstacle, to thereby detect a distance to the obstacle from the distance sensor 220. In FIG. 7, there is illustrated a measurement result of the distance sensor 220 having measured a distance to an obstacle from the distance sensor 220 in a warehouse in which the shelves 30 are arranged under the state of FIG. 2. The measurement result illustrated in FIG. 7 contains a plurality of pieces of measurement data shown by black circles 701, and those plurality of pieces of measurement data are locations at which light radiated by the distance sensor 220 is reflected.

The measurement data includes, as obstacles, a wall and shelf legs of the shelf 30 that are close to the distance sensor 220 and are detected in the warehouse. Specifically, four shelf legs of the shelf 30A, three shelf legs of the shelf 30B, three shelf legs of the shelf 30C, one shelf leg of the shelf 30D, and three shelf legs of the shelf 30E are detected as the obstacles.

Figure 8A:
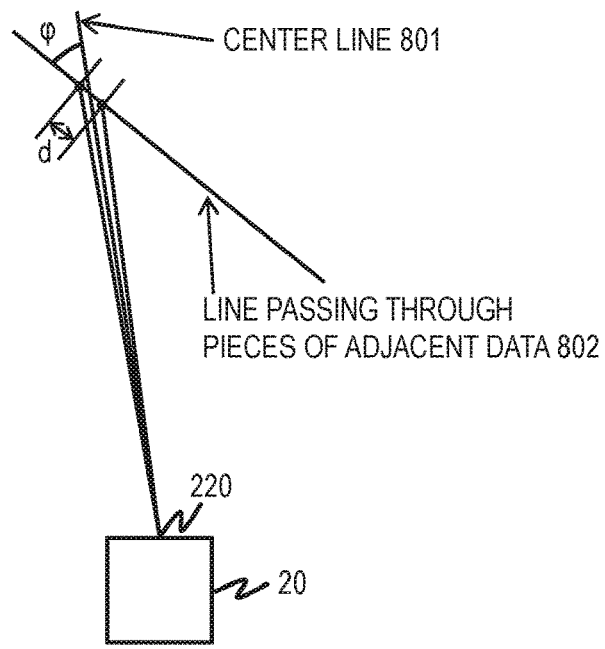
FIG. 8A is an explanatory diagram for illustrating processing of extracting a continuous portion in this embodiment.

FIG. 8A is an explanatory diagram for illustrating the processing of extracting a continuous portion in this embodiment.

In the processing of Step 602 illustrated in FIG. 6, the processor 420 extracts a continuous portion from the measurement data contained in the measurement result. Specifically, the processor 420 determines whether or not a distance (d) between adjacent pieces of measurement data is equal to or smaller than a threshold value (d0) set in advance. For example, the threshold value is set to 2 centimeters. When the distance (d) between adjacent pieces of measurement data is equal to or smaller than the threshold value (d0), the processor 420 determines that the adjacent pieces of measurement data are a continuous portion.

Further, when the distance (d) between adjacent pieces of measurement data is larger than the threshold value (d0) and an angle (φ) between a center line 801 extending from the distance sensor 220 to pass through a midpoint of the adjacent pieces of measurement data and a line 802 passing through the adjacent pieces of measurement data is equal to or larger than a threshold value (φ0), the adjacent pieces of measurement data are determined to be a continuous portion.

Figure 8B:
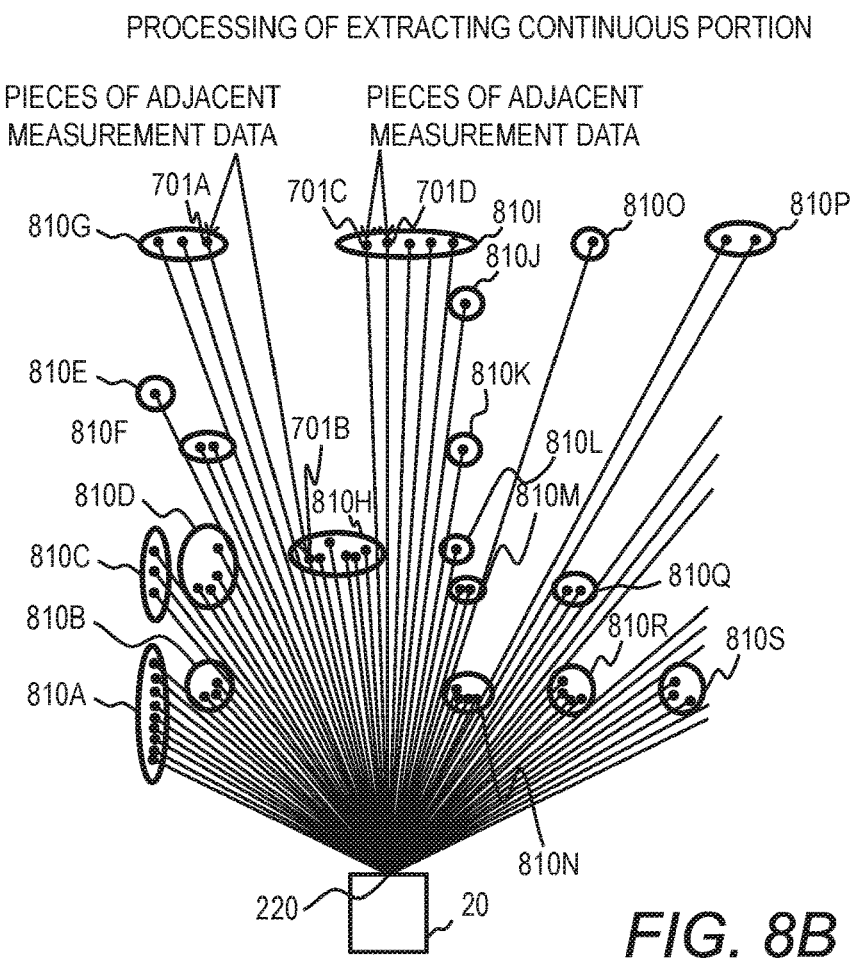
FIG. 8B is an explanatory diagram for illustrating the continuous portion extracted from the measurement result in this embodiment.

FIG. 8B is an explanatory diagram for illustrating the continuous portion extracted from the measurement result in this embodiment.

When the processing of extracting a continuous portion illustrated in FIG. 8A is executed for the measurement result illustrated in FIG. 7, continuous portions 810A to 810S illustrated in FIG. 8B are extracted. For example, pieces of measurement data 701A and 701B illustrated in FIG. 8B are adjacent. The distance (d) between the pieces of measurement data 701A and 701B is larger than the threshold value (d0), and the angle ($\varphi$) between a center line extending from the distance sensor 220 to pass through the midpoint of the pieces of measurement data 701A and 701B and a line passing through the pieces of measurement data 701A and 701B is smaller than the threshold value ($\varphi$0). Thus, the pieces of measurement data 701A and 701B are not extracted as a continuous portion.

Meanwhile, the distance (d) between the pieces of measurement data 701C and 701D is larger than the threshold value (d0), but the angle ($\varphi$) between a center line extending from the distance sensor 220 to pass through the midpoint of the pieces of measurement data 701C and 701D and a line passing through the pieces of measurement data 701C and 701D is larger than the threshold value ($\varphi$0). Thus, the pieces of measurement data 701C and 701D are extracted as a continuous portion.

As the distance from the distance sensor 220 becomes larger, the distance between adjacent pieces of measurement data becomes larger. As a result, for example, an angle between a center line of adjacent pieces of measurement data located on the same line and to be extracted as a continuous portion as in the case of the pieces of measurement data 701C and 701D, and a line passing through the adjacent pieces of measurement data becomes larger. Meanwhile, an angle between a center line of adjacent pieces of measurement data not located on the same line and not to be extracted as a continuous portion as in the case of the pieces of measurement data 701A and 701B, and a line passing through the adjacent pieces of measurement data becomes smaller. Thus, it is possible to extract pieces of measurement data that are far from the distance sensor 220 as a continuous portion through determination of whether or not an angle between the center line and the line passing through adjacent pieces of measurement data is equal to or larger than a threshold value.

Figure 9A:
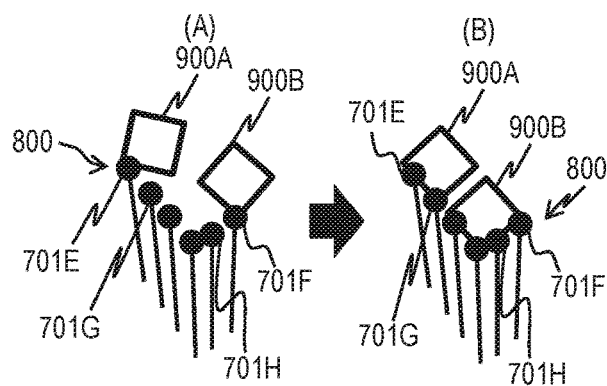
FIG. 9A is explanatory diagrams for illustrating processing of calculating arrangement positions of shelf leg candidates when two or three shelf leg candidates are contained in a continuous portion in this embodiment.
Figure 9B:
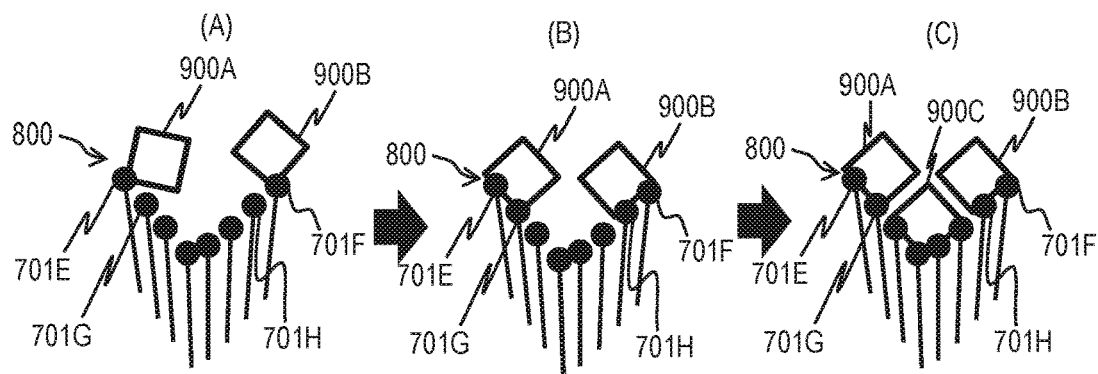
FIG. 9B is explanatory diagrams for illustrating processing of calculating arrangement positions of shelf leg candidates when two or three shelf leg candidates are contained in a continuous portion in this embodiment.
Figure 9C:
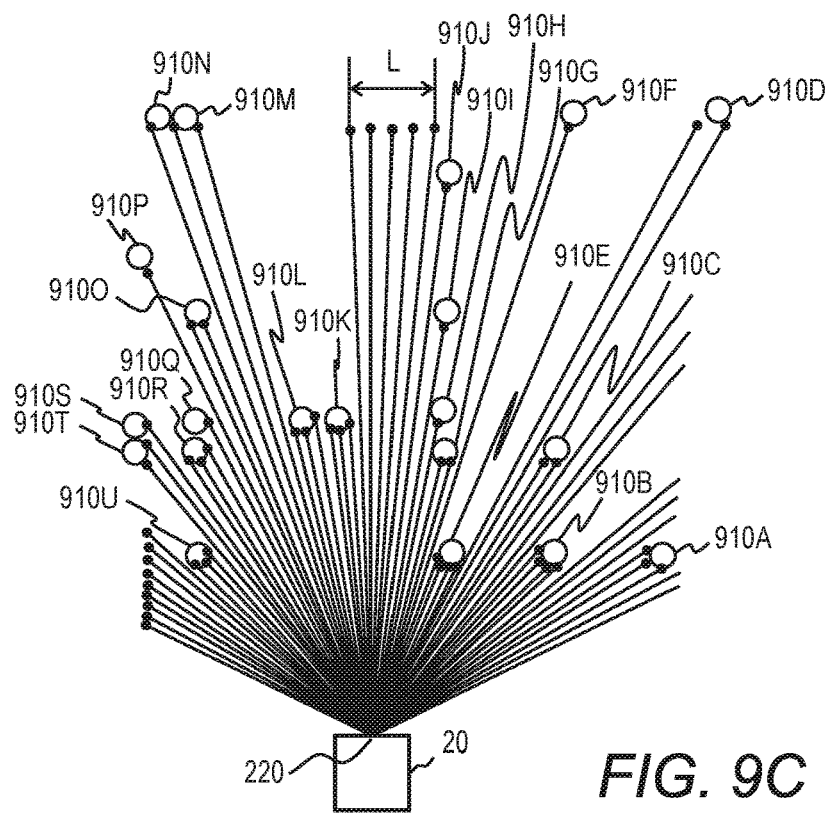
FIG. 9C is an explanatory diagram for illustrating shelf leg candidates extracted from the measurement result in this embodiment.

Next, with reference to FIG. 9A to FIG. 9C, the processing of extracting a shelf leg candidate, which is the processing of Step 603 illustrated in FIG. 6, is described.

In the processing of extracting a shelf leg candidate, the processor 420 calculates a distance (L) between two continuous pieces of data that are ends of each continuous portion. Next, when the calculated distance (L) is equal to or smaller than the threshold value (L0) registered in the shelf leg model 503 of the shelf model data 500, the processor 420 determines that the continuous portion includes one shelf leg candidate. In this case, the processor 420 calculates, as an arrangement position of the shelf leg candidate, a position obtained by adding an offset $\alpha$ set in advance to the distance (D) from the distance sensor 220 to the center position of the continuous portion. The offset $\alpha$ is the radius of a shelf leg when the shelf leg is a cylinder, whereas the offset $\alpha$ is a value calculated to be (short side length+diagonal line length)/4 when the shelf leg is a cuboid.

Further, when the distance (L) between two continuous pieces of data that are ends of each continuous portion is larger than the threshold value (L0) registered in the shelf leg model 503 of the shelf model data 500, the processor 420 determines whether or not the distance (L) is larger than the threshold value (L0) registered in the shelf leg model 503 of the shelf model data 500 and is equal to or smaller than a value (2L0+$\delta$) obtained by adding the offset ($\delta$) registered in the shelf leg model 503 to a value obtained by doubling the threshold value (L0).

When the distance (L) between two continuous pieces of data that are ends of each continuous portion is larger than 2L0+$\delta$, the processor 420 does not extract the continuous portion as a shelf leg candidate.

When the distance (L) between two continuous pieces of data that are ends of each continuous portion is larger than the threshold value (L0) and smaller than 2L0+$\delta$, the processor 420 determines that two or three shelf leg candidates are contained in the continuous portion.

The offset ($\delta$) registered in the shelf leg model 503 is set to a larger one of the threshold value (d0) used for extracting a continuous portion and a value (d1) calculated by the following Formula 1.

$$d_1 = D\sin\frac{\varphi}{2}\left\{\frac{1}{\sin(180\ deg - \phi_0 - \varphi/2)} + \frac{1}{\sin(\phi_0 - \varphi/2)}\right\} \quad \text{[Formula 1]}$$

In Formula 1, D represents a distance from the center position of a continuous portion to the distance sensor 220, $\varphi$ represents the angle ($\varphi$) illustrated in FIG. 8A, and $\varphi$0 represents the threshold value ($\varphi$0) of the angle illustrated in FIG. 8A.

FIG. 9A and FIG. 9B are explanatory diagrams for illustrating processing of calculating arrangement positions of shelf leg candidates when two or three shelf leg candidates are contained in a continuous portion in this embodiment. In FIG. 9A and FIG. 9B, a description is given based on the assumption that the shape of a shelf leg is a cuboid for the simplicity of description.

First, the processor 420 virtually arranges shelf leg models 900A and 900B representing shapes of a shelf leg, which are identified by data enabling identification of the shape of a shelf leg registered in the shelf leg model 503, in pieces of measurement data 701E and 701F, which are ends of the continuous portion 800, respectively. The state of the shelf leg models 900A and 900B being arranged is illustrated in part (A) of FIG. 9A and part (A) of FIG. 9B.

Next, the processor 420 rotates the shelf leg model 900A so that a side of the shelf leg model 900A is matched with a line passing through the measurement data 701E and measurement data 701G adjacent to the measurement data 701E. Similarly, the processor 420 rotates the shelf leg model 900B so that a side of the shelf leg model 900B is matched with a line passing through measurement data 701F and measurement data 701H adjacent to the measurement data 701F. The state of the shelf leg models 900A and 900B being arranged is illustrated in part (B) of FIG. 9A and part (B) of FIG. 9B.

In part (B) of FIG. 9A, all the pieces of measurement data contained in the continuous portion are located on the sides of the shelf leg models 900A and 900B. Thus, two shelf leg candidates are contained in the continuous portion, and the arrangement positions of the shelf leg candidates are positions obtained by rotating the shelf leg models 900A and 900B.

Meanwhile, in part (B) of FIG. 9B, there are pieces of measurement data that are not located on the sides of the shelf leg models 900A and 900B among pieces of measurement data contained in the continuous portion, and thus the processor 420 determines that three shelf leg candidates are contained in the continuous portion. Then, the processor 420 arranges a shelf leg model 900C so that sides of the shelf leg model 900C are matched with pieces of measurement data that are not located on the sides of the shelf leg models 900A and 900B. The state of the third shelf leg model 900C being arranged is illustrated in part (C) of FIG. 9B. The arrangement positions of shelf leg candidates in this case are positions at which the shelf leg models 900A to 900C illustrated in part (C) of FIG. 9B are arranged.

Even when one shelf leg candidate is contained in the continuous portion, the arrangement position of the shelf leg candidate may be calculated by virtually arranging a shelf leg model as described with reference to FIG. 9A and FIG. 9B.

FIG. 9C is an explanatory diagram for illustrating shelf leg candidates extracted from the measurement result in this embodiment.

When the processing of extracting shelf leg candidates is executed for the continuous portions 810A to 810S illustrated in FIG. 8B, shelf leg candidates 910A to 910U illustrated in FIG. 9C are extracted.

No shelf leg candidate is extracted from the continuous portions 810A and 810I illustrated in FIG. 8B. Further, two shelf leg candidates (910S and 910T, 910Q and 910R, and 910M and 910N) are extracted from the continuous portions 810C, 810D, and 810D, respectively.

Figure 10A:
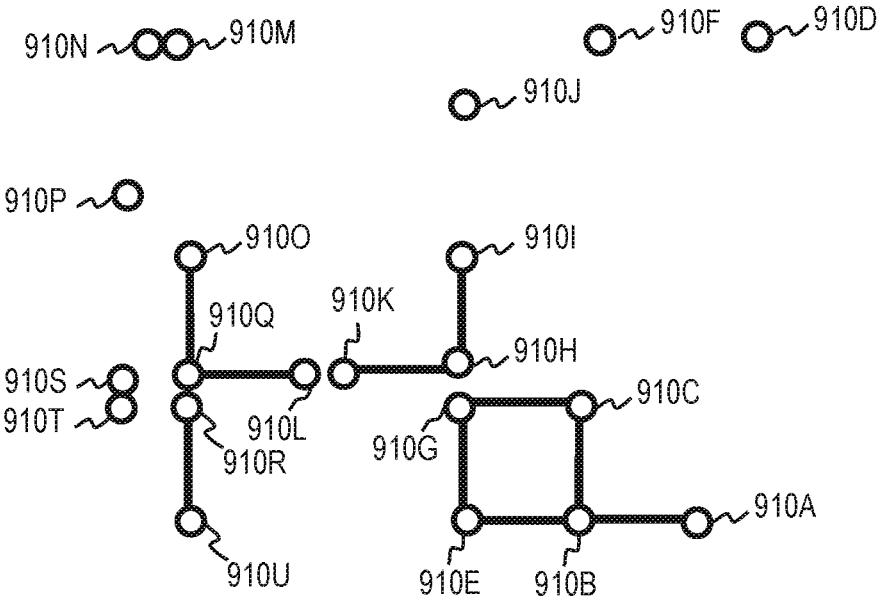
FIG. 10A is an explanatory diagram for illustrating combinations of shelf leg candidates extracted as shelf side candidates having the shelf leg distance P1 in this embodiment.
Figure 10B:
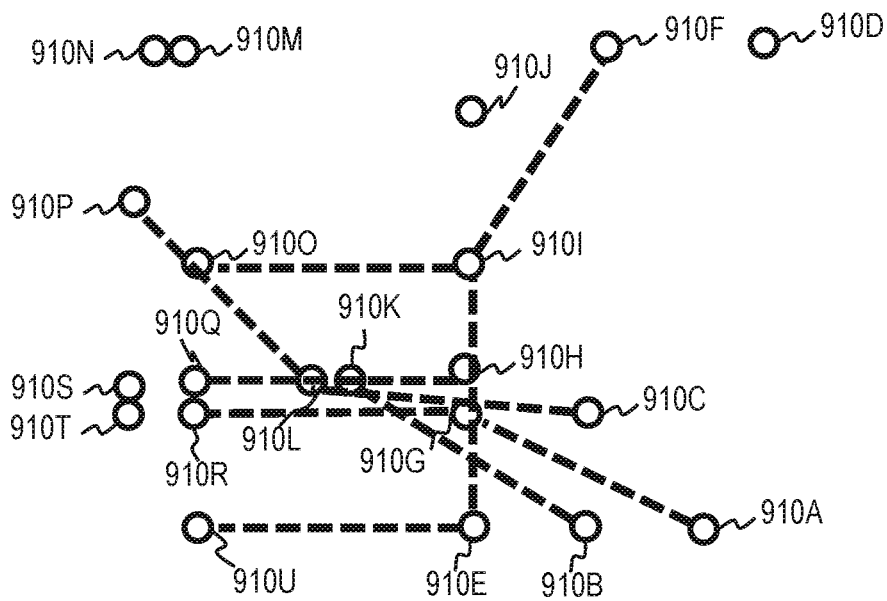
FIG. 10B is an explanatory diagram for illustrating combinations of shelf leg candidates extracted as shelf side candidates having the shelf leg distance P2 in this embodiment.

Next, with reference to FIG. 10A and FIG. 10B, a description is given of the processing of extracting combinations of shelf leg candidates satisfying the shelf leg distance of the shelf model data 500 in the processing of Step 603 illustrated in FIG. 6.

The shelf model data 500 shown in FIG. 5 includes a side (shelf side) of the shelf 30 having a shelf leg distance of P1 and a shelf side having a shelf leg distance of P2. The processor 420 calculates a distance (P) between two shelf leg candidates, extracts a combination of shelf leg candidates for which a difference between the calculated distance P and P1 is equal to or smaller than a threshold value set in advance as a shelf side candidate having the shelf leg distance P1, and extracts a combination of shelf leg candidates for which a difference between the calculated distance P and P2 is equal to or smaller than a threshold value set in advance as a shelf side candidate having the shelf leg distance P2. The threshold value is, for example, 3 centimeters.

FIG. 10A is an explanatory diagram for illustrating combinations of shelf leg candidates extracted as shelf side candidates having the shelf leg distance P1 in this embodiment.

Combinations of shelf leg candidates extracted as shelf side candidates having the shelf leg distance P1 are a combination of shelf leg candidates 910A and 910B, a combination of shelf leg candidates 910B and 910C, a combination of shelf leg candidates 910B and 910E, a combination of shelf leg candidates 910C and 910G, a combination of shelf leg candidates 910E and 910G, a combination of shelf leg candidates 910H and 910I, a combination of shelf leg candidates 910H and 910K, a combination of shelf leg candidates 910L and 910Q, a combination of shelf leg candidates 910O and 910Q, and a combination of shelf leg candidates 910R and 910U.

FIG. 10B is an explanatory diagram for illustrating combinations of shelf leg candidates extracted as shelf side candidates having the shelf leg distance P2 in this embodiment.

Combinations of shelf leg candidates extracted as shelf side candidates having the shelf leg distance P2 are a combination of shelf leg candidates 910A and 910G, a combination of shelf leg candidates 910B and 910K, a combination of shelf leg candidates 910C and 910L, a combination of shelf leg candidates 910E and 910I, a combination of shelf leg candidates 910E and 910U, a combination of shelf leg candidates 910F and 910I, a combination of shelf leg candidates 910H and 910Q, a combination of shelf leg candidates 910I and 910O, a combination of shelf leg candidates 910G and 910R, and a combination of shelf leg candidates 910L and 910P.

Next, the processor 420 selects a shelf leg candidate to be processed from among combinations of shelf leg candidates extracted as shelf side candidates having the shelf leg distances P1 and P2. Then, when the selected shelf leg candidate to be processed is contained in two combinations of shelf leg candidates extracted as a shelf side candidate having the shelf leg distance P1, or is contained in one combination of shelf leg candidates extracted as a shelf side candidate having the shelf leg distance P1 and is contained in one combination of shelf leg candidates extracted as a shelf side candidate having the shelf leg distance P2, the processor 420 extracts the shelf leg candidate to be processed as a junction shelf leg candidate, which may be a vertex of the shelf 30.

In this embodiment, as described above with reference to FIG. 5, the shelf 30 of the type "A" has a shelf side having the shelf leg distance P1 as its short side and a shelf side having the shelf leg distance P2 as its long side. The shelf 30 of the type "B" has shelf sides having the shelf leg distance P1 as its short side and long side. Thus, when a shelf leg candidate contained in a combination of shelf leg candidates extracted as a shelf side candidate serves as a junction between a shelf side having the shelf leg distance P1 and a shelf side having the shelf leg distance P2 or a junction between two shelf sides of the shelf leg distance P1, the shelf leg candidate is extracted as a junction shelf leg candidate.

Regarding shelf leg candidates extracted as shelf side candidates having the shelf leg distance P1 or the shelf leg distance P2 illustrated in FIG. 10A and FIG. 10B, the shelf leg candidates 910B, 910C, 910E, 910G, 910H, 910I, 910O, 910Q, 910R, and 910U are extracted as junction shelf leg candidates.

Now, a description is given of which junction shelf leg candidate serves as a junction of which shelf side with reference to FIG. 11A to FIG. 11D.

Now, a description is given of which junction shelf leg candidate serves as a junction of which shelf side with reference to FIG. 11A to FIG. 11D.

Figure 11A:
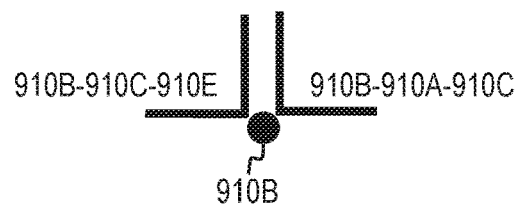
FIG. 11A is an explanatory diagram for illustrating a shelf side having a junction shelf leg candidate as its junction in this embodiment.

FIG. 11A is an explanatory diagram for illustrating a shelf side having the junction shelf leg candidate 910B as its junction in this embodiment. The shelf leg candidate 910B serves as a junction between the shelf side having the shelf leg distance P1 between the shelf leg candidate 910B and the shelf leg candidate 910A and the shelf side having the shelf leg distance P1 between the shelf leg candidate 910B and the shelf leg candidate 910C. The shelf leg candidate 910B also serves as a junction between the shelf side having the shelf leg distance P1 between the shelf leg candidate 910B and the shelf leg candidate 910C and the shelf side having the shelf leg distance P1 between the shelf leg candidate 910B and the shelf leg candidate 910E. Thus, the shelf leg candidate 910B may be a vertex of the shelf 30 of the type "B" having the shelf leg candidates 910A and 910C as its vertices. Further, the shelf leg candidate 910B may be a vertex of the shelf 30 of the type "B" having the shelf leg candidates 910C and 910E as its vertices.

Although not shown in FIG. 11A to FIG. 11D, the shelf leg candidate 910C serves as a junction between the shelf side having the shelf leg distance P1 between the shelf leg candidate 910C and the shelf leg candidate 910B and the shelf side having the shelf leg distance P1 between the shelf leg candidate 910C and the shelf leg candidate 910G. Thus, the shelf leg candidate 910C may be a vertex of the shelf 30 of the type "B" having the shelf leg candidates 910B and 910G as its vertices.

Figure 11B:
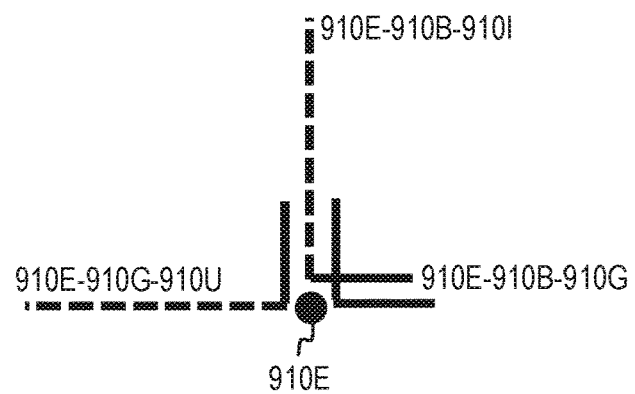
FIG. 11B is an explanatory diagram for illustrating a shelf side having a junction shelf leg candidate as its junction in this embodiment.

FIG. 11B is an explanatory diagram for illustrating a shelf side having the junction shelf leg candidate 910E as its junction in this embodiment. The shelf leg candidate 910E serves as: a junction between the shelf side having the shelf leg distance P1 between the shelf leg candidate 910E and the shelf leg candidate 910B and the shelf side having the shelf leg distance P1 between the shelf leg candidate 910E and the shelf leg candidate 910G; a junction between the shelf side having the shelf leg distance P1 between the shelf leg candidate 910E and the shelf leg candidate 910B and the shelf side having the shelf leg distance P2 between the shelf leg candidate 910E and the shelf leg candidate 910I; a junction between the shelf side having the shelf leg distance P1 between the shelf leg candidate 910E and the shelf leg candidate 910G and the shelf side having the shelf leg distance P2 between the shelf leg candidate 910E and the shelf leg candidate 910U. Thus, the shelf leg candidate 910E may be a vertex of the shelf 30 of the type "B" having the shelf leg candidates 910B and 910G as its vertices, may be a vertex of the shelf 30 of the type "A" having the shelf leg candidates 910B and 910I as its vertices, and may be a vertex of the shelf 30 of the type "A" having the shelf leg candidates 910G and 910U as its vertices.

Although not shown in FIG. 11A to FIG. 11D, the junction shelf leg candidate 910G serves as a junction between the shelf side having the shelf leg distance P1 between the junction shelf leg candidate 910G and the shelf leg candidate 910C and the shelf side having the shelf leg distance P1 between the junction shelf leg candidate 910G and the shelf leg candidate 910E. The junction shelf leg candidate 910G also serves as a junction between the shelf side having the shelf leg distance P1 between the junction shelf leg candidate 910G and the shelf leg candidate 910E and the shelf side having the shelf leg distance P2 between the junction shelf leg candidate 910G and the shelf leg candidate 910R. Thus, the shelf leg candidate 910G may be a vertex of the shelf 30 of the type "B" having the shelf leg candidates 910C and 910E as its vertices, or may be a vertex of the shelf 30 of the type "A" having the shelf leg candidates 910E and 910R as its vertices.

Although not shown in FIG. 11A to FIG. 11D, the junction shelf leg candidate 910H serves as a junction between the shelf side having the shelf leg distance P1 between the junction shelf leg candidate 910H and the shelf leg candidate 910I and the shelf side having the shelf leg distance P1 between the junction shelf leg candidate 910H and the shelf leg candidate 910K. The junction shelf leg candidate 910H also serves as a junction between the shelf side having the shelf leg distance P1 between the junction shelf leg candidate 910H and the shelf leg candidate 910I and the shelf side having the shelf leg distance P2 between the junction shelf leg candidate 910H and the shelf leg candidate 910Q. Thus, the shelf leg candidate 910H may be a vertex of the shelf 30 of the type "B" having the shelf leg candidates 910I and 910K as its vertices, or may be a vertex of the shelf 30 of the type "A" having the shelf leg candidates 910I and 910Q as its vertices.

Although not shown in FIG. 11A to FIG. 11D, the junction shelf leg candidate 910I serves as a junction between the shelf side having the shelf leg distance P1 between the junction shelf leg candidate 910I and the shelf leg candidate 910H and the shelf side having the shelf leg distance P2 between the junction shelf leg candidate 910I and the shelf leg candidate 910O. Thus, the shelf leg candidate 910I may be a vertex of the shelf 30 of the type "A" having the shelf leg candidates 910H and 910O as its vertices.

Although not shown in FIG. 11A to FIG. 11D, the junction shelf leg candidate 910O serves as a junction between the shelf side having the shelf leg distance P1 between the junction shelf leg candidate 910O and the shelf leg candidate 910Q and the shelf side having the shelf leg distance P2 between the junction shelf leg candidate 910O and the shelf leg candidate 910I. Thus, the shelf leg candidate 910O may be a vertex of the shelf 30 of the type "A" having the shelf leg candidates 910Q and 910I as its vertices.

Figure 11C:
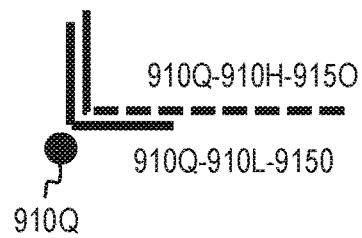
FIG. 11C is an explanatory diagram for illustrating a shelf side having a junction shelf leg candidate as its junction in this embodiment.

FIG. 11C is an explanatory diagram for illustrating a shelf side having the junction shelf leg candidate 910Q as its junction in this embodiment. The shelf leg candidate 910Q serves as a junction between the shelf side having the shelf leg distance P1 between the shelf leg candidate 910Q and the shelf leg candidate 910L and the shelf side having the shelf leg distance P1 between the shelf leg candidate 910Q and the shelf leg candidate 910L. The shelf leg candidate 910Q also serves as a junction between the shelf side having the shelf leg distance P1 between the shelf leg candidate 910Q and the shelf leg candidate 910O and the shelf side having the shelf leg distance P2 between the shelf leg candidate 910Q and the shelf leg candidate 910H. Thus, the shelf leg candidate 910Q may be a vertex of the shelf 30 of the type "B" having the shelf leg candidates 910L and 910O as its vertices. Further, the shelf leg candidate 910B may be a vertex of the shelf 30 of the type "A" having the shelf leg candidates 910O and 910H as its vertices.

Although not shown in FIG. 11A to FIG. 11D, the shelf leg candidate 910R serves as a junction between the shelf side having the shelf leg distance P1 between the shelf leg candidate 910R and the shelf leg candidate 910U and the shelf side having the shelf leg distance P2 between the shelf leg candidate 910R and the shelf leg candidate 910G. Thus, the shelf leg candidate 910R may be a vertex of the shelf 30 of the type "A" having the shelf leg candidates 910U and 910G as its vertices.

Figure 11D:
FIG. 11D is an explanatory diagram for illustrating a shelf side having a junction shelf leg candidate as its junction in this embodiment.

FIG. 11D is an explanatory diagram for illustrating a shelf side having the junction shelf leg candidate 910U as its junction in this embodiment. The shelf leg candidate 910U serves as a junction between the shelf side having the shelf leg distance P1 between the shelf leg candidate 910U and the shelf leg candidate 910R and the shelf side having the shelf leg distance P2 between the shelf leg candidate 910U and the shelf leg candidate 910E. Thus, the shelf leg candidate 910U may be a vertex of the shelf 30 of the type "A" having the shelf leg candidates 910R and 910E as its vertices.

Next, the processor 420 virtually arranges the shelf 30 having, as its vertices, each extracted junction shelf leg candidate and shelf leg candidates that are end points of two shelf sides having the junction shelf leg candidate as its junction, and simplifies each junction shelf leg candidate by deleting a redundant shelf side of the same shelf 30 from shelf sides having the junction shelf leg candidate as its junction in common.

Figure 12:
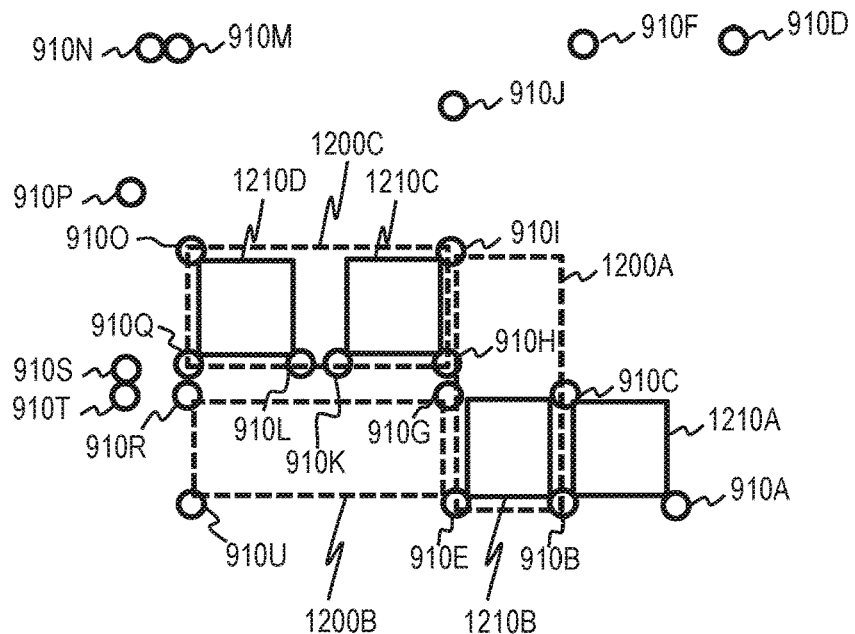
FIG. 12 is an explanatory diagram for illustrating a state of shelves being virtually arranged on each junction shelf leg candidate in this embodiment.
Figure 13A:
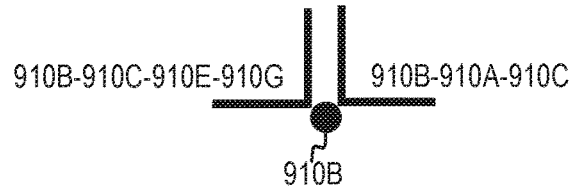
FIG. 13A is an explanatory diagram for illustrating shelf sides having a simplified junction shelf leg candidate as its junction in this embodiment.
Figure 13B:
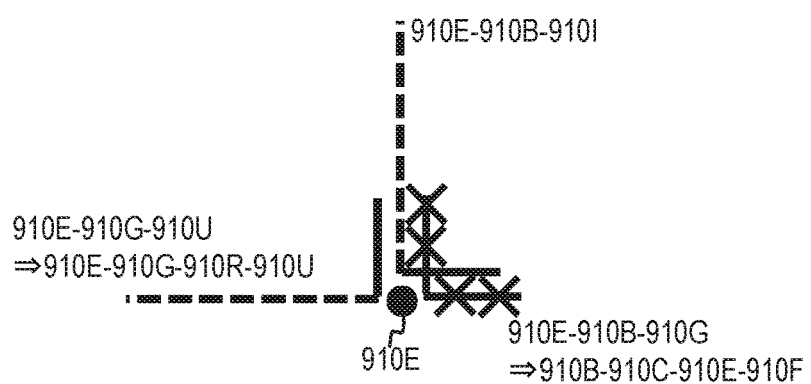
FIG. 13B is an explanatory diagram for illustrating shelf sides having a simplified junction shelf leg candidate as its junction in this embodiment.

FIG. 12 is an explanatory diagram for illustrating a state of the shelves 30 being virtually arranged on each junction shelf leg candidate in this embodiment. FIG. 13A is an explanatory diagram for illustrating shelf sides having the simplified junction shelf leg candidate 910B as its junction in this embodiment. FIG. 13B is an explanatory diagram for illustrating shelf sides having the simplified junction shelf leg candidate 910E as its junction in this embodiment. FIG.

Figure 13C:
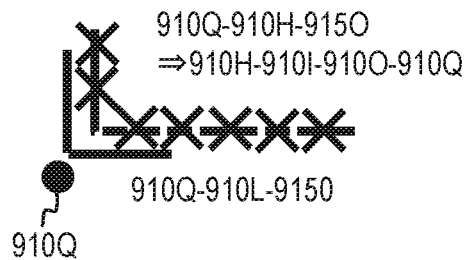
FIG. 13C is an explanatory diagram for illustrating shelf sides having a simplified junction shelf leg candidate as its junction in this embodiment.
Figure 13D:
FIG. 13D is an explanatory diagram for illustrating shelf sides having a simplified junction shelf leg candidate as its junction in this embodiment.

13C is an explanatory diagram for illustrating shelf sides having the simplified junction shelf leg candidate 910Q as its junction in this embodiment. FIG. 13D is an explanatory diagram for illustrating shelf sides having the simplified junction shelf leg candidate 910U as its junction in this embodiment.

A shelf 1210A of the type "B" having the shelf leg candidates 910A and 910C as its vertices is virtually arranged on the junction shelf leg candidate 910B. Further, a shelf 1210B of the type "B" having the shelf leg candidates 910C and 910E as its vertices is virtually arranged on the junction shelf leg candidate 910B. The shelf 1210B includes the shelf leg candidates 910B, 910C, 910G, and 910E as its vertices, and thus, as illustrated in FIG. 13A, the processor 420 also associates the shelf leg candidate 910G with the shelf side having the shelf leg distance P1 between the junction shelf leg candidate 910B and the shelf leg candidate 910C and the shelf side having the shelf leg distance P1 between the junction shelf leg candidate 910B and the shelf leg candidate 910E.

Further, the processor 420 deletes the shelf side of the shelf 1210B with respect to the junction shelf leg candidates 910C, 910E, and 910G serving as vertices of the shelf 1210B. For example, regarding the junction shelf leg candidate 910E, as illustrated in FIG. 13B, the processor 420 deletes association of a shelf side between the junction shelf leg candidate 910E and the shelf leg candidate 910B to a shelf side between the junction shelf leg candidate 910E and the shelf leg candidate 910G.

A shelf 1200A of the type "A" having the shelf leg candidates 910B and 910I as its vertices is virtually arranged on the junction shelf leg candidate 910E, and a shelf 1200B of the type "A" having the shelf leg candidates 910G, 910R, and 910U as its vertices is also virtually arranged on the junction shelf leg candidate 910E. The shelf 1200B has the shelf leg candidates 910E, 910G, 910R, and 910U as its vertices, and thus, as illustrated in FIG. 13B, the processor 420 also associates the shelf leg candidate 910R with the shelf side having the shelf leg distance P1 between the junction shelf leg candidate 910E and the shelf leg candidate 910G and the shelf side having the shelf leg distance P2 between the junction shelf leg candidate 910E and the shelf leg candidate 910U.

Further, the processor 420 deletes the shelf side of the shelf 1200B with respect to the junction shelf leg candidates 910G, 910R, and 910U serving as vertices of the shelf 1200B. For example, regarding the junction shelf leg candidate 910U, as illustrated in FIG. 13D, the processor 420 deletes association of a shelf side between the junction shelf leg candidate 910U and the shelf leg candidate 910R to a shelf side between the junction shelf leg candidate 910U and the shelf leg candidate 910E.

A shelf 1210C of the type "B" having the shelf leg candidates 910I and 910K as its vertices is virtually arranged on the junction shelf leg candidate 910H. Further, a shelf 1200C of the type "A" having the shelf leg candidates 910I, 910O, and 910Q as its vertices is virtually arranged on the junction shelf leg candidate 910H. The shelf 1200C includes the shelf leg candidates 910H, 910I, 910O, and 910Q as its vertices, thus the processor 420 also associates the shelf leg candidate 910O with the shelf side having the shelf leg distance P1 between the junction shelf leg candidate 910H and the shelf leg candidate 910I and the shelf side having the shelf leg distance P2 between the junction shelf leg candidate 910H and the shelf leg candidate 910Q.

Further, the processor 420 deletes the shelf side of the shelf 1200C with respect to the junction shelf leg candidates 910I, 910O, and 910Q serving as vertices of the shelf 1200C. For example, regarding the junction shelf leg candidate 910Q, as illustrated in FIG. 13C, the processor 420 deletes association of a shelf side between the junction shelf leg candidate 910Q and the shelf leg candidate 910O to a shelf side between the junction shelf leg candidate 910Q and the shelf leg candidate 910H.

A shelf 1210D of the type "B" having the shelf leg candidates 910L and 910O as its vertices is virtually arranged on the junction shelf leg candidate 910Q.

In this manner, a relationship between each junction shelf leg candidate and shelf sides is simplified.

Next, the processor 420 calculates a shelf arrangement candidate so that a shelf leg candidate that is determined as a shelf leg of one shelf 30 is not a shelf leg of another shelf 30. In the example illustrated in FIG. 12, when a shelf arrangement candidate includes the shelf 1200A, the shelf 1200A has the shelf leg candidates 910B, 910E, and 910I as its vertices, and the shelf leg candidates 910B, 910E, and 910I construct the shelf 1200A. Thus, the shelf 1210A having the shelf leg candidate 910B as its vertex, the shelf 1210B having the shelf leg candidates 910B and 910E as its vertices, the shelf 1200B having the shelf leg candidate 910E as its vertex, and the 1210C having the shelf leg candidate 910I as its vertex are not contained in the shelf arrangement candidate, and shelf arrangement candidates are calculated for all the combinations of the shelf 1200A and shelves other than those shelves 1210A, 1210B, 1200B, and 1210C. When two shelf leg candidates that are not used in any of the shelves 30 construct a shelf side candidate for each shelf arrangement candidate, a new shelf arrangement candidate in which the shelf 30 having the shelf side candidate as its component, which is arranged at that position, may be added. In this embodiment, for the simplicity of description, a description is given using shelf arrangement candidates illustrated in FIG. 14A to FIG. 14C as an example.

Figure 14A:
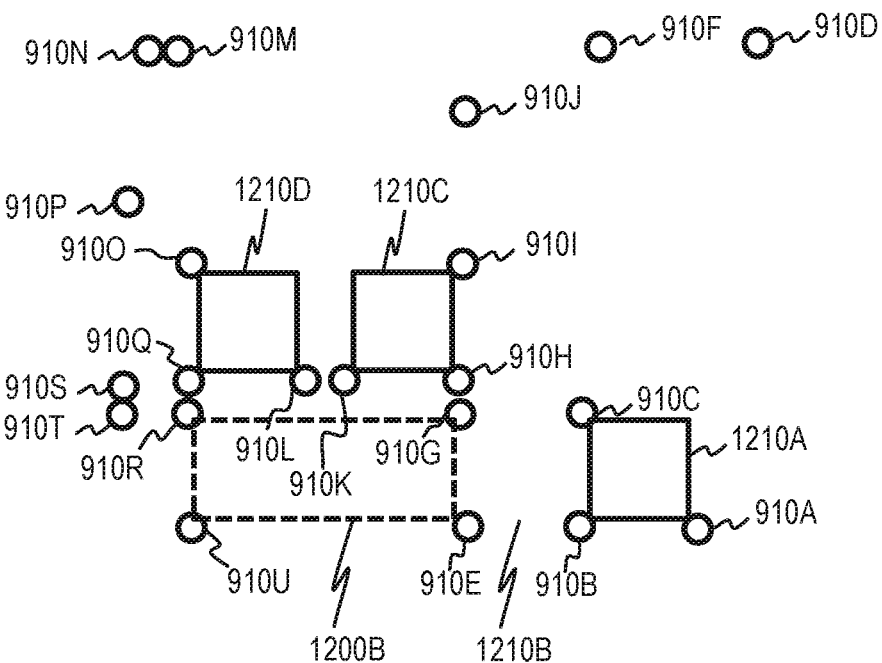
FIG. 14A is an explanatory diagram for illustrating a first shelf arrangement candidate in this embodiment.

FIG. 14A is an explanatory diagram for illustrating a first shelf arrangement candidate in this embodiment. The first shelf arrangement candidate includes the shelves 1210A, 1210C, 1210D, and 1200B.

Figure 14B:
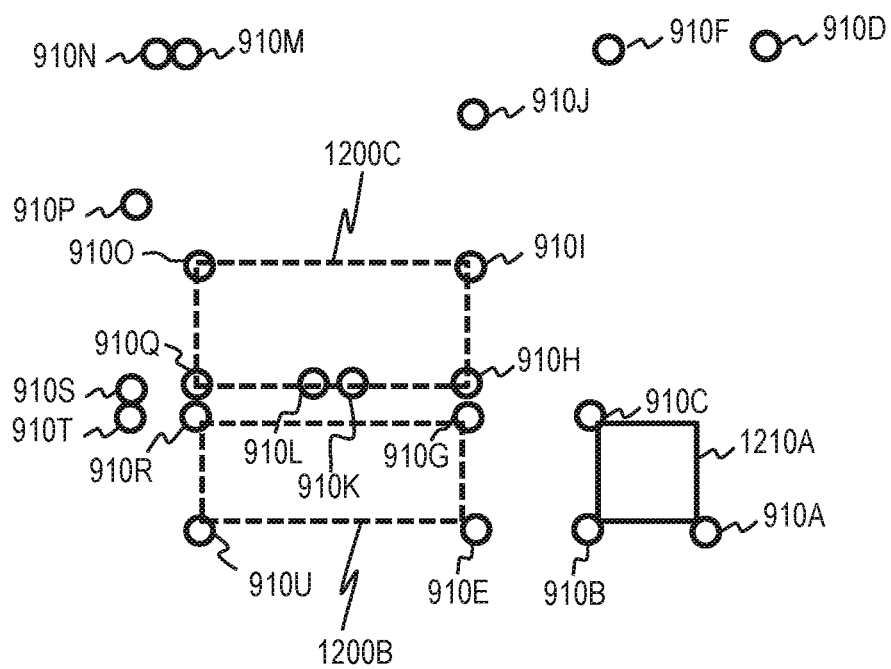
FIG. 14B is an explanatory diagram for illustrating a second shelf arrangement candidate in this embodiment.

FIG. 14B is an explanatory diagram for illustrating a second shelf arrangement candidate in this embodiment. The second shelf arrangement candidate includes the shelves 1210A, 1200B, and 1200C.

Figure 14C:
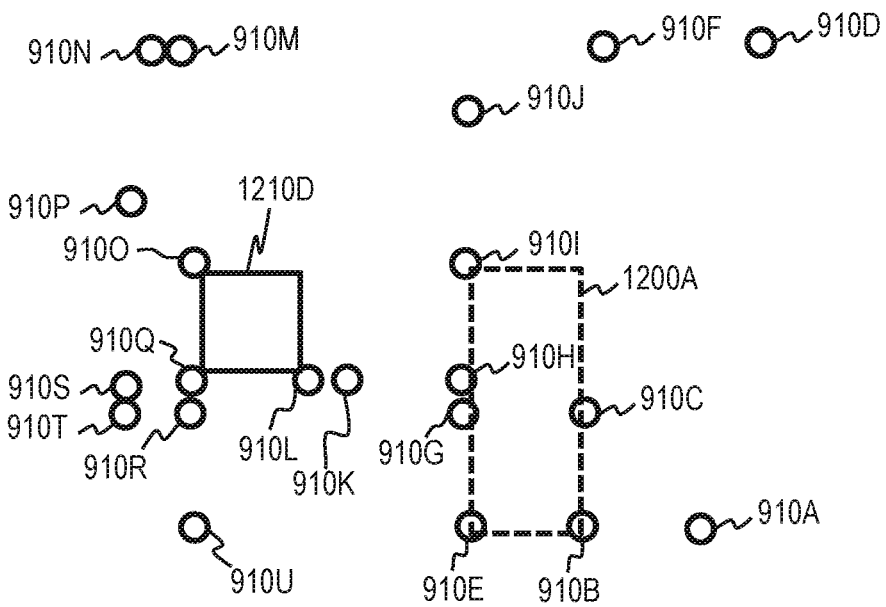
FIG. 14C is an explanatory diagram for illustrating a third shelf arrangement candidate in this embodiment.

FIG. 14C is an explanatory diagram for illustrating a third shelf arrangement candidate in this embodiment. The third shelf arrangement candidate includes the shelves 1200A and 1210D.

Figure 15A:
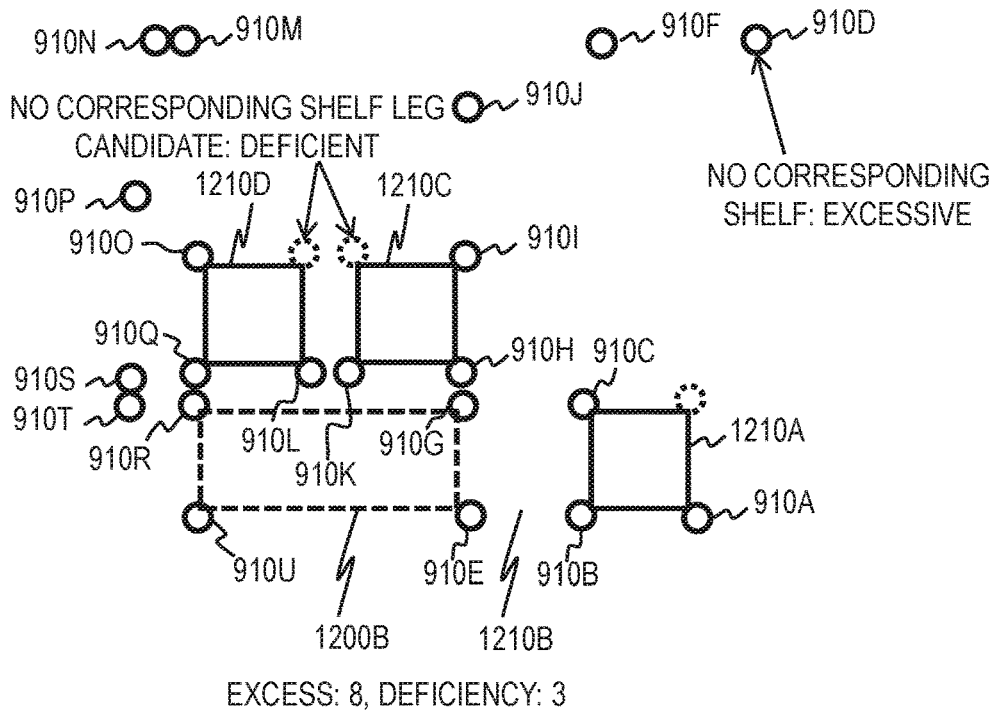
FIG. 15A is an explanatory diagram for illustrating calculation of the excessive/deficient number of shelf leg candidates in the first shelf arrangement candidate in this embodiment.
Figure 15B:
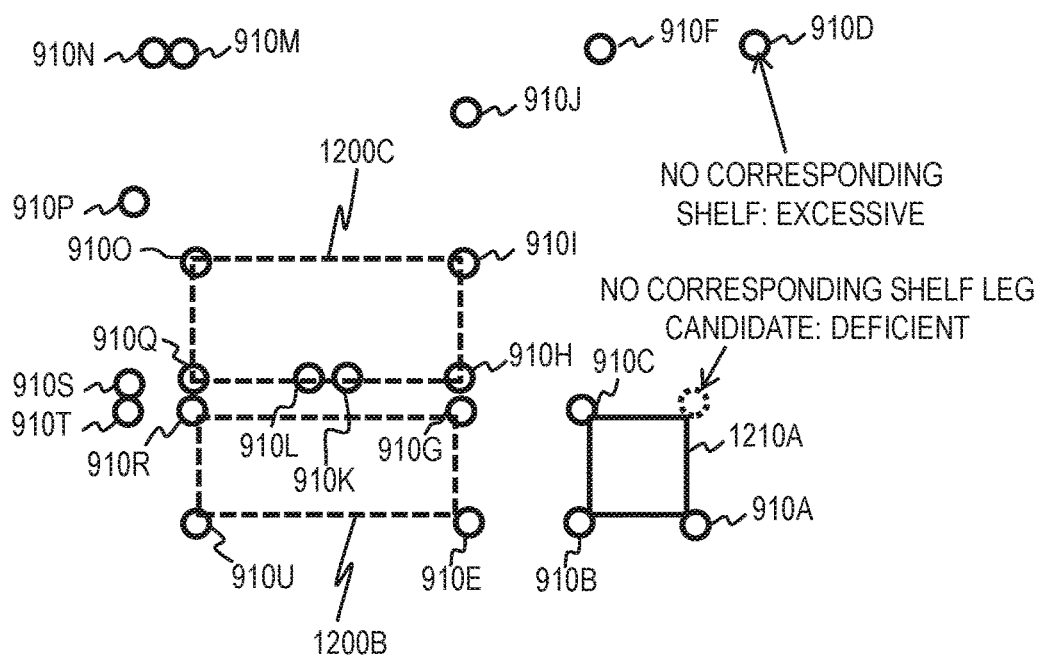
FIG. 15B is an explanatory diagram for illustrating calculation of the excessive/deficient number of shelf leg candidates in the second shelf arrangement candidate in this embodiment.
Figure 15C:
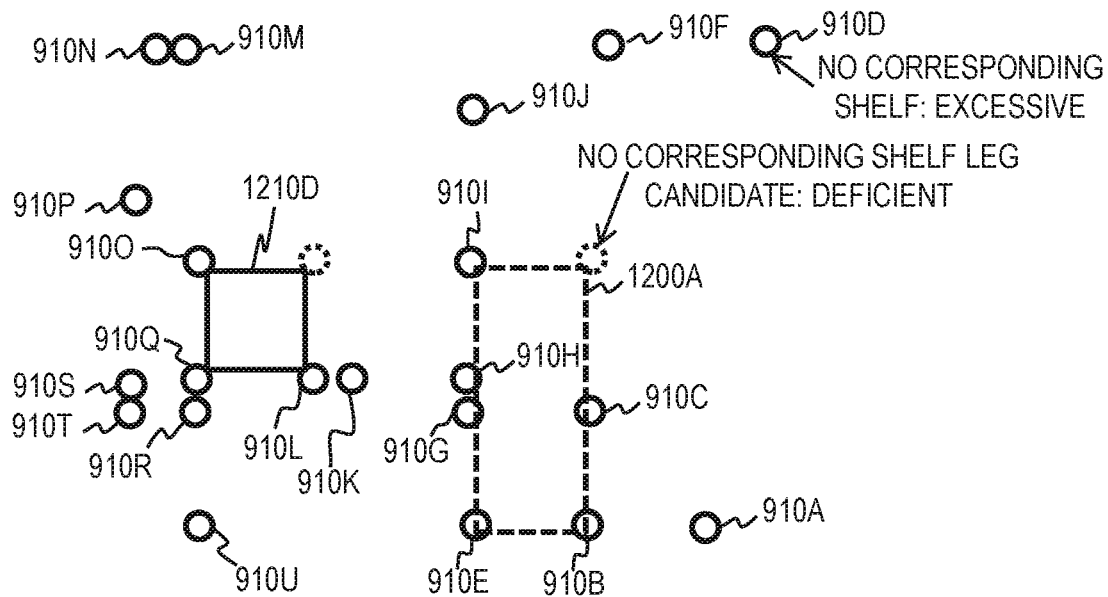
FIG. 15C is an explanatory diagram for illustrating calculation of the excessive/deficient number of shelf leg candidates in the third shelf arrangement candidate in this embodiment.

Next, with reference to FIG. 15A to FIG. 15C, a description is given of calculation of the excessive/deficient number of shelf leg candidates in each shelf arrangement candidate in the processing of Step 604 illustrated in FIG. 6.

FIG. 15A is an explanatory diagram for illustrating calculation of the excessive/deficient number of shelf leg candidates in the first shelf arrangement candidate in this embodiment.

In the first shelf arrangement candidate, shelf leg candidates that do not serve as shelf legs of the shelves 1210A, 1210C, 1210D, and 1200B are the shelf leg candidates 910D, 910F, 910J, 910M, 910N, 910P, 910S, and 910T. The excessive number of shelf leg candidates, which indicates the number of shelf leg candidates that do not serve as shelf legs of any leg in the first shelf arrangement candidate, is eight.

Further, in the first shelf arrangement candidate, one shelf leg candidate that is supposed to be a shelf leg is not extracted for each of the shelves 1210A, 1210C, and 1210D. The deficient number of shelf leg candidates in the first shelf arrangement candidate is three.

A shelf arrangement is determined from the excessive/deficient number of shelf leg candidates based on a plurality of shelf arrangement candidates. The excessive/deficient number of shelf leg candidates in a shelf arrangement candidate is conceivable, for example, as a value for evaluating the shelf arrangement candidate in order to determine the shelf arrangement. The excessive/deficient number of shelf leg candidates in a shelf arrangement candidate is calculated by adding the excessive number of shelf leg candidates in the shelf arrangement candidate to the excessive/deficient number of shelf leg candidates in the shelf arrangement candidate. A shelf arrangement candidate having a small excessive/deficient number of shelf leg candidates is likely to be the valid shelf arrangement. The excessive/deficient number of shelf leg candidates in the shelf arrangement candidate is eleven. The excessive/deficient number of shelf leg candidates is an example of evaluation of a shelf arrangement candidate, and this invention is not limited thereto. Usage of an evaluation value obtained by weighing and adding the excessive number of shelf leg candidates and the deficient number of shelf leg candidates is conceivable as an example of other evaluation. When the distance sensor 220 has a characteristic of containing a large amount of noises, the excessive number of shelf leg candidates increases inevitably. In such a case, it is possible to accurately evaluate validity of a shelf arrangement candidate through such weighting as to weight the deficient number of shelf leg candidates. In contrast, in order to alleviate influences of noises of distance sensor 220, a method of extracting shelf leg candidates, which avoids containing the continuous portion 810 having a small number of measurement points as in the case of the continuous portion 810E of FIG. 8E, is conceivable, but this method increases the deficient number of shelf leg candidates inevitably. In such a case, it is possible to accurately evaluate validity of a shelf arrangement candidate through such weighting as to weight the excessive number of shelf leg candidates.

FIG. 15B is an explanatory diagram for illustrating calculation of the excessive/deficient number of shelf leg candidates in the second shelf arrangement candidate in this embodiment.

In the second shelf arrangement candidate, shelf leg candidates that do not serve as shelf legs of the shelves 1210A, 1200C, and 1200B are the shelf leg candidates 910D, 910F, 910J, 910K, 910L, 910M, 910N, 910P, 910S, and 910T. The excessive number of shelf leg candidates, which indicates the number of shelf leg candidates that do not serve as shelf legs of any leg in the second shelf arrangement candidate, is ten.

Further, in the second shelf arrangement candidate, one shelf leg candidate that is supposed to be a shelf leg is not extracted for the shelf 1210A. The deficient number of shelf leg candidates in the second shelf arrangement candidate is one.

Thus, the excessive/deficient number of shelf leg candidates in the second shelf arrangement candidate is eleven.

FIG. 15C is an explanatory diagram for illustrating calculation of the excessive/deficient number of shelf leg candidates in the third shelf arrangement candidate in this embodiment.

In the third shelf arrangement candidate, shelf leg candidates that do not serve as shelf legs of the shelves 1200A and 1210D are the shelf leg candidates 910A, 910C, 910D, 910F, 910G, 910H, 910J, 910K, 910M, 910N, 910P, 910S, 910R, 910T and 910U. The excessive number of shelf leg candidates, which indicates the number of shelf leg candidates that do not serve as shelf legs of any leg in the third shelf arrangement candidate, is fifteen.

Further, in the third shelf arrangement candidate, one shelf leg candidate that is supposed to be a shelf leg is not extracted for each of the shelves 1210A and 1210D, and hence the deficient number of shelf leg candidates in the third shelf arrangement candidate is two.

Thus, the excessive/deficient number of shelf leg candidates in the third shelf arrangement candidate is seventeen.

As described above, the processor 420 determines the first shelf arrangement candidate or the second shelf arrangement candidate, which has the smallest excessive/deficient number of shelf leg candidates, as the shelf arrangement.

When the processor 420 calculates the excessive/deficient number of shelf leg candidates, the processor 420 may calculate the excessive/deficient number of shelf leg candidates in consideration of occlusion. Occlusion refers to, for example, a situation in which a shelf leg is hidden by another shelf leg or another object closer to the distance sensor 220 than the shelf leg is. The processor 420 can calculate the excessive/deficient number of shelf leg candidates in consideration of occlusion by not counting such a shelf leg into the deficient number of shelf leg candidates. Further, the processor 420 may calculate the excessive/deficient number of shelf leg candidates in consideration of the measurement range of the distance sensor 220 at the time of calculating the excessive/deficient number of shelf leg candidates. When the shelf leg of a shelf 30 is not included in the measurement range of the distance sensor 220, it is possible to accurately evaluate the validity of the shelf arrangement candidate by avoiding counting the deficient number of shelf leg candidates with respect to the shelf leg of the shelf 30. Now, a description is given of processing of calculating the excessive/deficient number of shelf leg candidates in consideration of occlusion with reference to FIG. 16A to FIG. 16C.

Figure 16A:
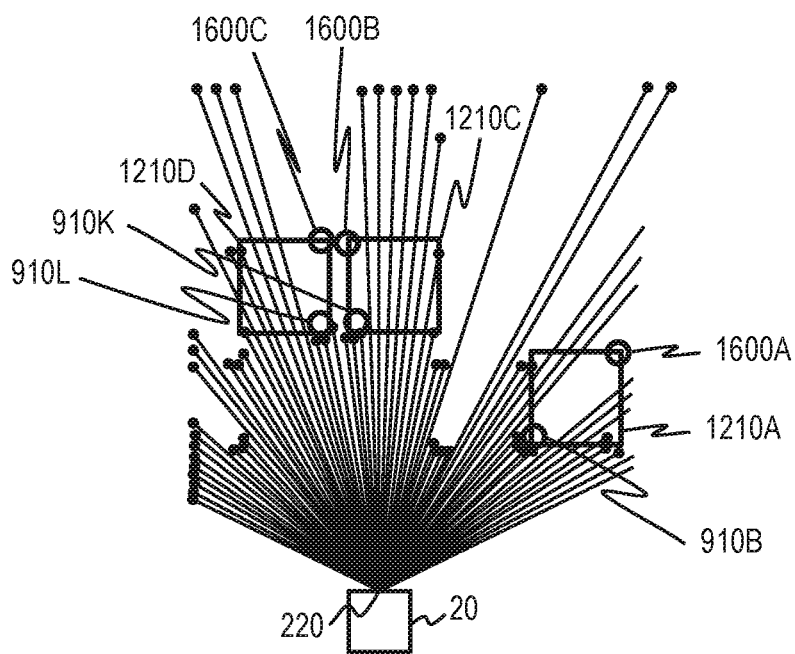
FIG. 16A is an explanatory diagram for illustrating calculation of the excessive/deficient number of shelf leg candidates in consideration of occlusion of the first shelf arrangement candidate in this embodiment.

FIG. 16A is an explanatory diagram for illustrating calculation of the excessive/deficient number of shelf leg candidates in consideration of occlusion of the first shelf arrangement candidate in this embodiment.

First, the processor 420 identifies a position of a shelf at which a shelf leg candidate supposed to be a shelf leg is not extracted. For example, in the case of the shelf 1210A, the position of an unextracted shelf leg is an intersection between a line from the shelf leg candidate 910A, which is parallel to a line between the shelf leg candidates 910B and 910C, and a line from the shelf leg candidate 910C, which is parallel to a line between the shelf leg candidate 910A and the shelf leg candidate 910B.

Next, when there is a piece of measurement data extracted as a shelf leg candidate on a line from the position of the unextracted shelf leg to the distance sensor 220, the processor 420 determines that the position of the unextracted shelf leg is due to occlusion caused by the shelf leg candidate of the piece of measurement data. Then, the processor 420 adds 1 to the calculated deficient number of shelf leg candidates by considering that a shelf leg candidate is not deficient in that position.

In FIG. 16A, the positions of the unextracted shelf leg of the shelves 1210A, 1210C, and 1210D are identified as positions 1600A, 1600B, and 1600C, respectively.

There is a piece of measurement data extracted as the shelf leg candidate 910B on a line between the position 1600A and the distance sensor 220, and thus the position 1600A is not counted as the deficient number of shelf leg candidates. Similarly, there is a piece of measurement data extracted as the shelf leg candidate 910K on a line between the position 1600B and the distance sensor 220, and thus the position 1600B is not counted as the deficient number of shelf leg candidates. Further, there is a piece of measurement data extracted as the shelf leg candidate 910L on a line between the position 1600C and the distance sensor 220, and thus the position 1600C is not counted as the deficient number of shelf leg candidates.

Thus, the deficient number of shelf leg candidates in the first shelf arrangement candidate is zero, and the excessive/deficient number of shelf leg candidates in the first shelf arrangement candidate is eight.

Figure 16B:
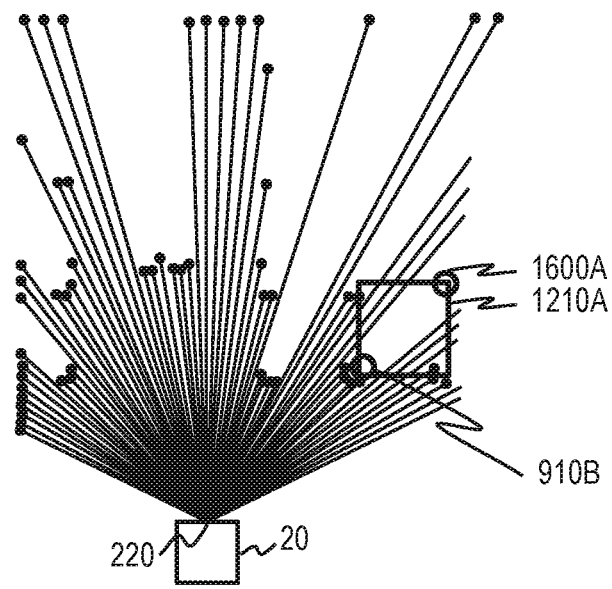
FIG. 16B is an explanatory diagram for illustrating calculation of the excessive/deficient number of shelf leg candidates in consideration of occlusion of the second shelf arrangement candidate in this embodiment.

FIG. 16B is an explanatory diagram for illustrating calculation of the excessive/deficient number of shelf leg candidates in consideration of occlusion of the second shelf arrangement candidate in this embodiment.

In FIG. 16B, the positions of the unextracted shelf leg of the shelf 1210A is identified as the position 1600A.

There is a piece of measurement data extracted as the shelf leg candidate 910B on a line between the position 1600A and the distance sensor 220, and thus the position 1600A is not counted as the deficient number of shelf leg candidates. Thus, the deficient number of shelf leg candidates in the second shelf arrangement candidate is two, and the excessive/deficient number of shelf leg candidates in the second shelf arrangement candidate is ten.

FIG. 16B is an explanatory diagram for illustrating calculation of the excessive/deficient number of shelf leg candidates in consideration of occlusion of the second shelf arrangement candidate in this embodiment.

In FIG. 16B, the positions of the unextracted shelf leg of the shelf 1210A is identified as the position 1600A.

There is a piece of measurement data extracted as the shelf leg candidate 910B on a line between the position 1600A and the distance sensor 220, and thus the position 1600A is not counted as the deficient number of shelf leg candidates. Thus, the deficient number of shelf leg candidates in the second shelf arrangement candidate is two, and the excessive/deficient number of shelf leg candidates in the second shelf arrangement candidate is ten.

Figure 16C:
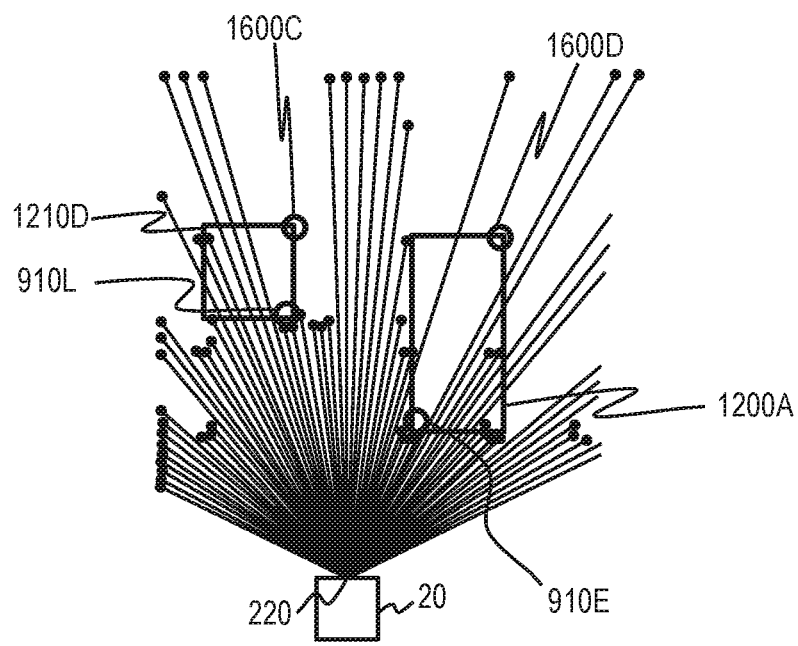
FIG. 16C is an explanatory diagram for illustrating calculation of the excessive/deficient number of shelf leg candidates in consideration of occlusion of the third shelf arrangement candidate in this embodiment.

FIG. 16C is an explanatory diagram for illustrating calculation of the excessive/deficient number of shelf leg candidates in consideration of occlusion of the third shelf arrangement candidate in this embodiment.

In FIG. 16C, the positions of the unextracted shelf leg of the shelves 1200A and 1210D are identified as positions 1600D and 1600C, respectively.

There is a piece of measurement data extracted as the shelf leg candidate 910E on a line between the position 1600D and the distance sensor 220, and thus the position 1600D is not counted as the deficient number of shelf leg candidates. As described above with reference to FIG. 16A, the position 1600C is also not counted as the deficient number of shelf leg candidates. Thus, the deficient number of shelf leg candidates in the third shelf arrangement candidate zero, and the excessive/deficient number of shelf leg candidates in the third shelf arrangement candidate is fifteen.

Therefore, the first shelf arrangement candidate has the smallest excessive/deficient number of shelf leg candidates, and the first shelf arrangement candidate is determined as the shelf arrangement.

In this manner, the shelf transport vehicle 20 can determine the shelf arrangement in consideration of occlusion of a shelf leg, and thus it is possible to determine the shelf arrangement more accurately. The above description is an example of a shelf leg candidate causing occlusion, but this invention includes cases of other objects represented by continuous portions of measurement data causing occlusion. In that case, this invention can be implemented by replacing the shelf leg candidate of the above description with continuous portions of measurement data.

The processor 420 may evaluate the shelf arrangement candidate in consideration of the number of shelf leg candidates or the number or length of continuous portions of measurement data interfering with the shelf 30 in the shelf arrangement candidate. Now, a description is given of the processing that considers the number of interfering shelf leg candidates with reference to FIG. 17A and FIG. 17B. The shelf leg candidates or continuous portions of measurement data interfering with the shelf 30 in a shelf arrangement candidate is shelf leg candidates or continuous portions of measurement data located in a rectangle region formed by the shelf 30 in the shelf arrangement candidate. For example, there is no shelf leg between shelf legs in the shelf 30, and thus, when there is a shelf leg candidate between two shelf legs, the arrangement of the shelf 30 is highly likely to be a wrong arrangement.

The first shelf arrangement candidate does not have a shelf leg candidate interfering with the shelf 30.

Figure 17A:
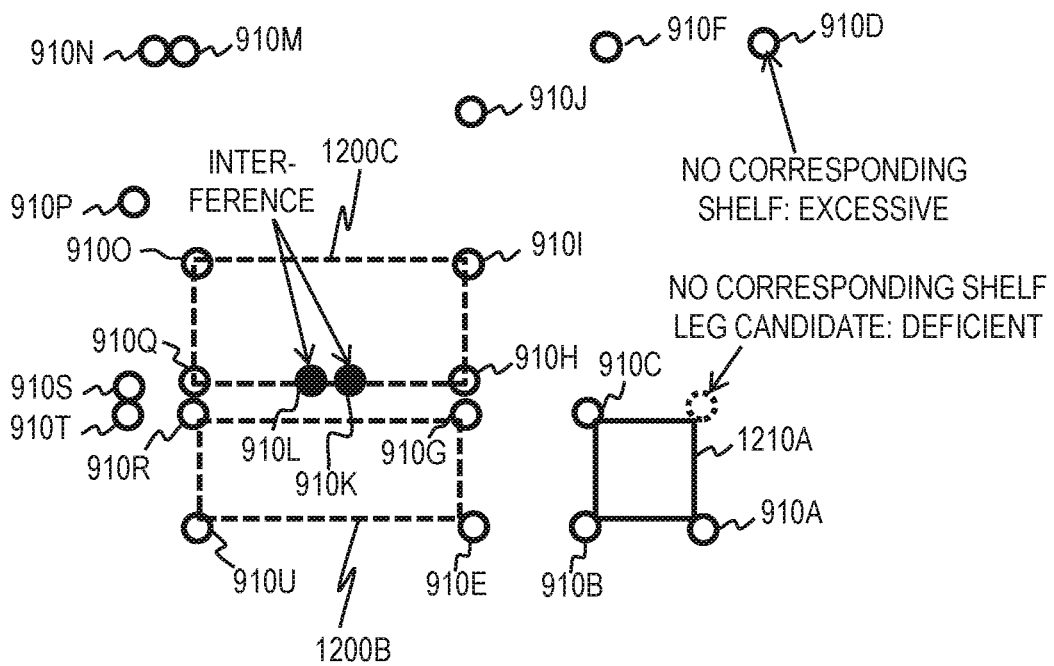
FIG. 17A is an explanatory diagram of a case in which the number of shelf leg candidates interfering with a shelf is considered when the second shelf arrangement candidate is evaluated in this embodiment.

FIG. 17A is an explanatory diagram of a case in which the number of shelf leg candidates interfering with the shelf 30 is considered when the second shelf arrangement candidate is evaluated in this embodiment.

In the second shelf arrangement candidate, the shelf leg candidates 910K and 910L are located between the shelf leg candidate 910H and the shelf leg candidate 910Q of the shelf 1200C. The number of interfering shelf leg candidates in the second shelf arrangement candidate is two. A value obtained by adding the excessive number of shelf leg candidates in the shelf arrangement candidate, the deficient number of shelf leg candidates in the shelf arrangement candidate, and the number of interfering shelf leg candidates is conceivable as an example of the evaluation value of the shelf arrangement candidate, which considers the number of interfering shelf leg candidates. This evaluation value indicates that the shelf arrangement candidate is likely to be more valid as the evaluation value becomes smaller similarly to the excessive/deficient number of shelf leg candidates. Thus, the evaluation value of the second shelf arrangement candidate is fifteen.

Figure 17B:
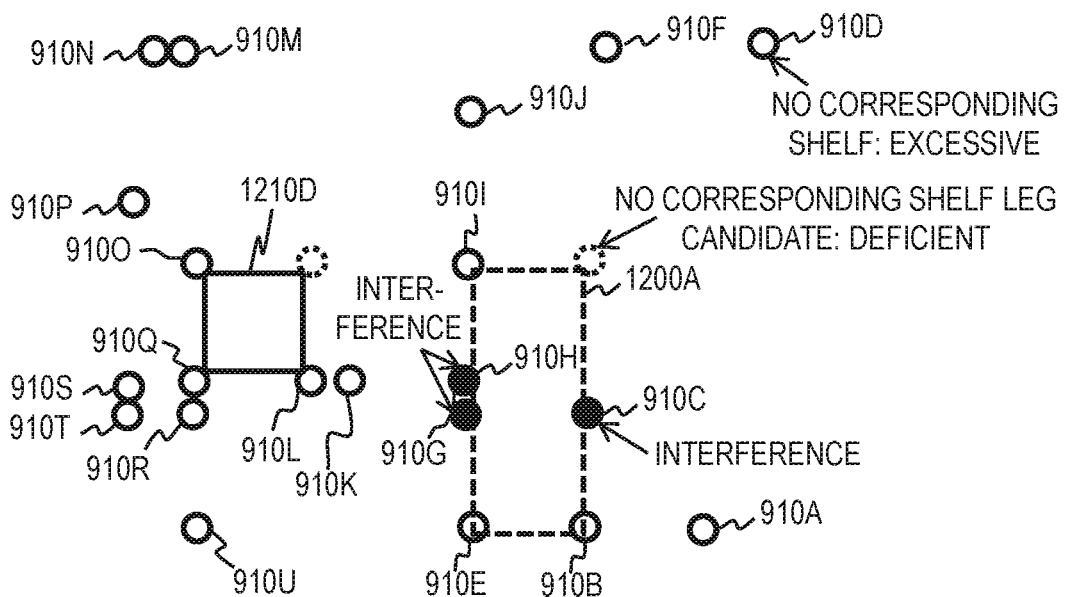
FIG. 17B is an explanatory diagram of a case in which the number of shelf leg candidates interfering with a shelf is considered when the third shelf arrangement candidate is evaluated in this embodiment.

FIG. 17B is an explanatory diagram of a case in which the number of shelf leg candidates interfering with the shelf 30 is considered when the third shelf arrangement candidate in this embodiment is evaluated.

In the third shelf arrangement candidate, the shelf leg candidates 910H and 910G are located between the shelf leg candidate 910E and the shelf leg candidate 910I of the shelf 1200A, and the shelf leg candidate 910C is located between the shelf leg candidate 910B and the unextracted shelf leg. The number of interfering shelf leg candidates in the third shelf arrangement candidate is three. Thus, the evaluation value of the third shelf arrangement candidate is twenty.

In this case, the first shelf arrangement candidate has the smallest evaluation value, and the first shelf arrangement candidate is determined as the shelf arrangement.

As described above, the shelf transport vehicle 20 can determine the shelf arrangement in consideration of the number of interfering shelf leg candidates, and thus it is possible to determine the shelf arrangement more accurately. The description given above is an example of considering an interference by a shelf leg candidate, but the case of considering an interference by another object represented by a continuous portion of measurement data can also be considered. A continuous portion of measurement data is longer than a shelf leg candidate. Thus, when the length of a continuous portion of measurement data is calculated to be N times the length of a shelf leg candidate, an interference by the continuous portion of the measurement data is required to be assumed to correspond to N times the interference of a shelf leg candidate. With this, it is possible to calculate the evaluation value of a shelf arrangement candidate.

According to this embodiment, the shelf transport vehicle 20 calculates a plurality of shelf arrangement candidates in which the shelves 30 are virtually arranged on shelf leg candidates extracted from the measurement result of the distance sensor 220 so as to satisfy the shelf leg distances registered in the shelf model data 500, calculates the excessive/deficient numbers of shelf leg candidates with respect to the calculated shelf arrangement candidates, determines a shelf arrangement based on the calculated excessive/deficient numbers of shelf leg candidates, and determines the shelf 30 to which the shelf transport vehicle 20 is to be moved based on the determined shelf arrangement. With this, even when there are a plurality of shelves 30 in the measurement range of the distance sensor 220, the shelf 30 to which the shelf transport vehicle 20 is to be moved can be determined, and even when the shelf transport vehicle 20 has failed to track its own position, the shelf transport vehicle 20 can recognize its own position again. Further, the shelf transport vehicle 20 can automatically detect and move the shelf 30 even before the shelves 30 are aligned, and thus it is possible to align the shelves 30 before being aligned.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment.

A part of the configuration of each embodiment may be added, deleted, or replaced by that of a different configuration. The above-described configurations, functions, and processors, for all or a part of them, may be implemented by hardware: for example, by designing an integrated circuit. The above-described configurations and functions may be implemented by software, which means that a processor interprets and executes programs providing the functions.

The information of programs, tables, and files to implement the functions may be stored in a storage device such as a memory, a hard disk drive, or an SSD (Solid State Drive), or a storage medium such as an IC card, or an SD card.

The drawings show control lines and information lines as considered necessary for explanations but do not show all control lines or information lines in the products. It can be considered that almost of all components are actually interconnected.

What is claimed is:

1. A shelf transport system, comprising:
   a shelf transport vehicle configured to transport a shelf, the shelf comprising a plurality of shelf legs,
   wherein the shelf transport vehicle comprises:
   a distance sensor configured to measure a distance to an obstacle;
   a processor coupled to a memory storing instructions that when executed configure the processor to:
   detect shelf leg candidates, which are candidates for the plurality of shelf legs, based on a measurement result of the distance sensor;
   calculate a plurality of shelf arrangement candidates, in each of which the shelf is virtually arranged on the detected shelf leg candidates;
   calculate, for each of the plurality of calculated shelf arrangement candidates an excessive number of shelf leg candidates, which indicates a number of shelf leg candidates other than shelf legs of the arranged shelf, and a deficient number of shelf leg candidates, which indicates a number of positions at which shelf leg candidates corresponding to shelf legs of the arranged shelf fail to be detected;
   determine a shelf arrangement from among the plurality of shelf arrangement candidates based on the excessive number of shelf leg candidates and the deficient number of shelf leg candidates; and
   determine a shelf to which the shelf transport vehicle is to be moved based on the determined shelf arrangement.

2. The shelf transport system according to claim 1, wherein the processor is configured to:
   identify, for each of the plurality of shelf arrangement candidates, a position at which a shelf leg candidate corresponding to a shelf leg of the arranged shelf fails to be detected; and
   exclude, when a measurement result exists on a line connecting the identified position and the distance sensor, the identified position from the deficient number of shelf leg candidates.

3. The shelf transport system according to claim 1, wherein the processor is configured to:
   calculate, for each of the plurality of shelf arrangement candidates, an evaluation based on the excessive number of shelf leg candidates and the deficient number of shelf leg candidates;
   lower the evaluation of one of the plurality of shelf arrangement candidates when another object exists in a region of the arranged shelf in the one of the plurality of shelf arrangement candidates; and
   determine the shelf arrangement from among the plurality of shelf arrangement candidates based on the evaluation.

4. The shelf transport system according to claim 1, wherein the processor is configured to:
   calculate a transport route of each shelf included in the determined shelf arrangement; and
   exclude, from candidates for the shelf to which the shelf transport vehicle is to be moved, a shelf having another shelf on the transport route of the shelf and a shelf having another object detected on the transport route of the shelf.

5. The shelf transport system according to claim 1, further comprising a shelf transport vehicle management apparatus configured to manage the shelf transport vehicle,
   wherein the shelf transport vehicle is configured to, upon determining the shelf to which the shelf transport vehicle is to be moved, transmit information on the shelf to which the shelf transport vehicle is to be moved and the determined shelf arrangement to the shelf transport vehicle management apparatus, and
   wherein the shelf transport vehicle management apparatus is configured to determine a transport destination of the shelf to which the shelf transport vehicle is to be moved as a position existing in a predetermined range from the shelf in the received shelf arrangement.

6. The shelf transport system according to claim 1, further comprising a shelf transport vehicle management apparatus configured to manage identification information on the shelf and position information on the shelf in association with each other, and to manage the shelf transport vehicle,
- wherein the shelf comprises a shelf identification information provision unit configured to allow the shelf transport vehicle to acquire the identification information on the shelf, and
- wherein the shelf transport vehicle is configured to:
  - get under the shelf to which the shelf transport vehicle is to be moved, between shelf legs of the shelf, and acquire the identification information on the shelf from the shelf identification information provision unit of the shelf that the shelf transport vehicle has got under; and
  - recognize position information on the shelf transport vehicle based on the position information associated with the acquired identification information on the shelf.

7. The shelf transport system according to claim 6, further comprising a landmark shelf, which is transported less frequently than other shelves,
- wherein a shelf leg of the landmark shelf has a retroreflective marker attached thereto,
- wherein the distance sensor is configured to radiate light and receive the light reflected by the obstacle, to thereby measure a distance to the obstacle,
- wherein the processor is configured to:
- discriminate the shelf leg of the landmark shelf from shelf legs of the other shelves based on a reflection intensity included in a result of the measurement, and
- upon determining the landmark shelf is included in the determined shelf arrangement preferentially determine the landmark shelf as the shelf to which the shelf transport vehicle is to be moved.

8. A shelf transport vehicle configured to transport a shelf comprising a plurality of shelf legs, the shelf transport vehicle comprising:
- a distance sensor configured to measure a distance to an obstacle;
- a processor coupled to a memory storing instructions that when executed configure the processor to:
- detect shelf leg candidates, which are candidates for the plurality of shelf legs, based on a measurement result of the distance sensor;
- calculate a plurality of shelf arrangement candidates, in each of which the shelf is virtually arranged on the detected shelf leg candidates;
- calculate, for each of the plurality of calculated shelf arrangement candidates an excessive number of shelf leg candidates, which indicates a number of shelf leg candidates other than shelf legs of the arranged shelf, and a deficient number of shelf leg candidates, which indicates a number of positions at which shelf leg candidates corresponding to shelf legs of the arranged shelf fail to be detected;
- determine a shelf arrangement from among the plurality of shelf arrangement candidates based on the excessive number of shelf leg candidates and the deficient number of shelf leg candidates; and
- determine a shelf to which the shelf transport vehicle is to be moved based on the determined shelf arrangement.

9. A shelf transport method, by a shelf transport vehicle comprising a processor and a memory area, configured to transport a shelf comprising a plurality of shelf legs, the shelf transport vehicle comprising a distance sensor configured to measure a distance to an obstacle, the shelf transport method comprising:
- detecting, by the processor, shelf leg candidates, which are candidates for the plurality of shelf legs, based on a measurement result of the distance sensor;
- calculating, by the processor, a plurality of shelf arrangement candidates, in each of which the shelf is virtually arranged on the detected shelf leg candidates;
- calculating, by the processor, for each of the calculated plurality of shelf arrangement candidates, an excessive number of shelf leg candidates, which indicates a number of shelf leg candidates other than shelf legs of the arranged shelf, and a deficient number of shelf leg candidates, which indicates a number of positions at which shelf leg candidates corresponding to shelf legs of the arranged shelf fail to be detected;
- determining, by the processor, a shelf arrangement from among the plurality of shelf arrangement candidates based on the calculated excessive number of shelf leg candidates and the calculated deficient number of shelf leg candidates; and
- determining, by the processor, a shelf to which the shelf transport vehicle is to be moved based on the determined shelf arrangement.

\* \* \* \* \*